(12) United States Patent
Cornell

(10) Patent No.: US 9,430,866 B2
(45) Date of Patent: *Aug. 30, 2016

(54) DERIVATIVE-BASED SELECTION OF ZONES FOR BANDED MAP DISPLAY

(75) Inventor: Brian Cornell, Kenmore, WA (US)

(73) Assignee: GOOGLE INC., Mountain View, CA (US)

( * ) Notice: Subject to any disclaimer, the term of this patent is extended or adjusted under 35 U.S.C. 154(b) by 658 days.

This patent is subject to a terminal disclaimer.

(21) Appl. No.: 13/566,387

(22) Filed: Aug. 3, 2012

(65) Prior Publication Data

US 2013/0093757 A1   Apr. 18, 2013

Related U.S. Application Data

(63) Continuation of application No. 13/271,427, filed on Oct. 12, 2011, now Pat. No. 8,243,102.

(51) Int. Cl.
  *G09G 5/00*  (2006.01)
  *G06T 15/20*  (2011.01)
  *G06T 17/05*  (2011.01)

(52) U.S. Cl.
  CPC .............. *G06T 15/20* (2013.01); *G06T 17/05* (2013.01)

(58) Field of Classification Search
  CPC .............................. G06T 15/20; G06T 17/05
  See application file for complete search history.

(56) References Cited

U.S. PATENT DOCUMENTS

| | | | |
|---|---|---|---|
| 4,972,319 A | 11/1990 | Delorme | |
| 5,263,136 A | 11/1993 | DeAguiar et al. | |
| 5,406,493 A | 4/1995 | Goto et al. | |
| 5,613,048 A | 3/1997 | Chen et al. | |
| 5,742,924 A * | 4/1998 | Nakayama | 701/458 |
| 5,760,783 A | 6/1998 | Migdal et al. | |
| 5,832,406 A | 11/1998 | Iwami et al. | |
| 6,061,628 A | 5/2000 | Hayashi et al. | |
| 6,184,888 B1 | 2/2001 | Yuasa et al. | |
| 6,445,999 B1 | 9/2002 | Nakamura | |
| 7,197,393 B2 | 3/2007 | Kim | |
| 7,353,114 B1 * | 4/2008 | Rohlf et al. | 702/5 |
| 7,609,258 B2 | 10/2009 | Suzuno et al. | |
| 7,646,927 B2 | 1/2010 | Matsubara | |
| 7,680,350 B2 | 3/2010 | Baxes | |
| 8,243,102 B1 | 8/2012 | Cornell | |

(Continued)

OTHER PUBLICATIONS

Maurer, et al., U.S. Appl. No. 13/271,391 entitled "Use of Banding to Optimize Map Rendering in a Three-Dimensional Tilt" filed Oct. 12, 2011.

*Primary Examiner* — Barry Drennan
*Assistant Examiner* — Robert Craddock
(74) *Attorney, Agent, or Firm* — Marshall, Gerstein & Borun LLP

(57) ABSTRACT

A graphics or image rendering system, such as a map image rendering system, determines a viewing window of a map surface to be displayed, wherein the viewing plane is at an angle of incidence with respect to the map surface. The method generally determines a depth boundary along the map surface where a height projection of a depth increment of a first unit of area is lower than a threshold height increment at a non-zero angle of incidence and at a single zoom level magnification. The method renders the first unit of area within the depth boundary and a second unit of area outside the depth boundary. The first unit of area is rendered at a first density of map data and the second unit of area is rendered at a second density of map data that is lower than the first density of map data.

20 Claims, 21 Drawing Sheets

(56) References Cited

U.S. PATENT DOCUMENTS

| | | |
|---|---|---|
| 2005/0035883 A1 | 2/2005 | Kameda et al. |
| 2005/0083325 A1 | 4/2005 | Cho |
| 2005/0219268 A1* | 10/2005 | Kyle .......................... 345/660 |
| 2008/0270468 A1 | 10/2008 | Mao et al. |
| 2009/0309877 A1 | 12/2009 | Snyder et al. |
| 2011/0054857 A1 | 3/2011 | Moguchaya |
| 2011/0169823 A1 | 7/2011 | Barenburg et al. |
| 2011/0191014 A1* | 8/2011 | Feng et al. .................... 701/200 |
| 2011/0221767 A1 | 9/2011 | Kostrezewski et al. |

\* cited by examiner

@ zoom level 10 magnification

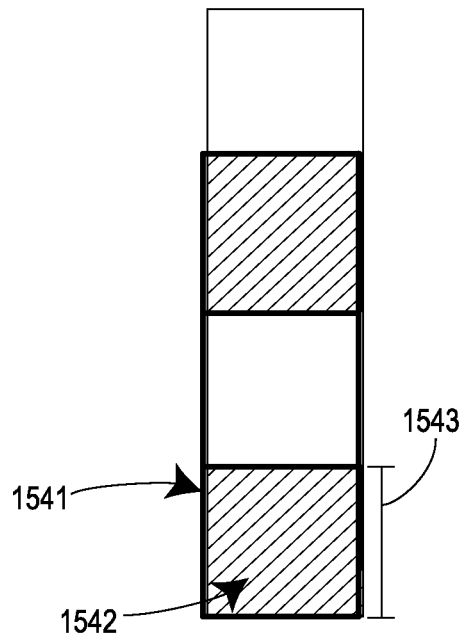
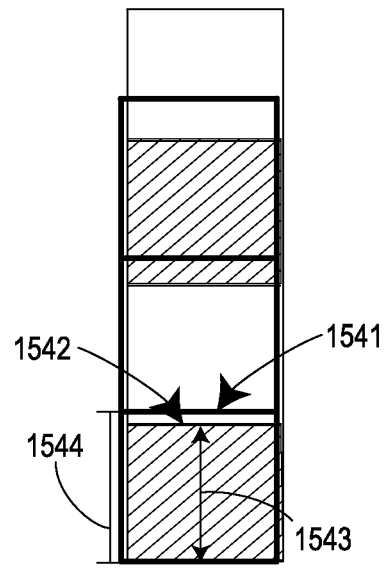
FIG. 15A    FIG. 15B
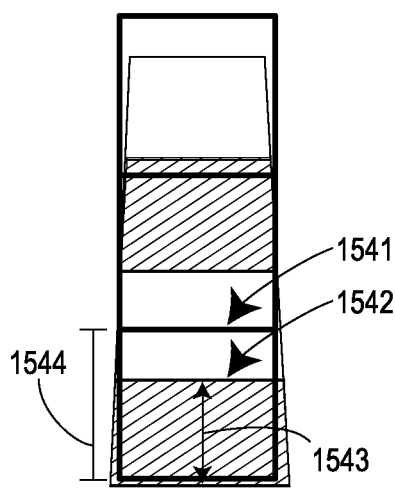
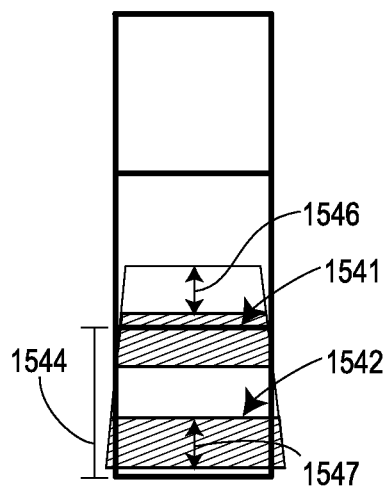
FIG. 15C    FIG. 15D

DERIVATIVE-BASED SELECTION OF ZONES FOR BANDED MAP DISPLAY

CROSS-REFERENCE TO RELATED APPLICATION

This application is a continuation of and claims priority to U.S. patent application Ser. No. 13/271,427 entitled "Derivative-Based Selection of Zones for Banded Map Display" filed on Oct. 12, 2011, the entire disclosure of which is hereby expressly incorporated by reference herein.

FIELD OF TECHNOLOGY

The present disclosure relates to image rendering systems, such as electronic map display systems, and more specifically to an image rendering system that renders a map surface as a set of depth bands having different resolution data.

BACKGROUND

With the widespread use of computer mapping tools and mapping applications, consumer demand for ready access to map data continues to grow at a high rate. While consumers have come to desire fast access to map data, the sheer amount of map data required to run these mapping applications places a premium on data management, both at a device level and at a network level. This premium may limit the effectiveness of mapping applications, which typically require comparatively large amounts of network data.

Mapping applications are found in a variety of mobile devices, including car navigation systems, hand-held GPS units, mobile phones, and portable computers. These applications are among the most frequently used applications and are considered, by some, necessary for personal safety. Although the underlying digital maps are easy to use from a user's perspective, creating a digital map is a data intensive process. Every digital map begins with a set of raw data corresponding to millions of streets and intersections. That raw map data is derived from a variety of sources, each providing different amounts and types of information. To effectively map a location, locate a driving route between a source and a destination, identify points of interest, etc. requires substantial amounts of data. Furthermore, many mapping applications require a display of different map data at different zoom levels, i.e., different scales, where the amount of detail and the nature of that detail changes at each zoom level. For example, at a lowest zoom level, scaled furthest away from a target, the map data may contain the boundaries of continents, oceans, and major landmasses. At subsequent zoom levels, that map data may identify countries, states, homelands, protectorates, other major geographic regions. While at even further subsequent zoom levels, that map data may contain major roads, cities, towns, until eventually the map data contains minor roads, buildings, down to even sidewalks and walk ways depending on the region. The amount of detail is determined by the sources of information used to construct the map data at each zoom level. But no matter the zoom level, the amount of information is voluminous and generally too large for storage, in total, on mobile devices and too large for continuous download over a wireless communication network.

In operation, mapping applications typically download map data to the mobile device through a wireless communication network and in response to a user entering a location of interest and/or based on the current location of the mobile device, such as the current global positioning satellite (GPS) data or current cellular network location data for the device. A conventional technique for downloading map data is to have the mobile device communicate this location data to a remote processor on the wireless communication network, which, in response, downloads all map data to the mobile device or the map data requested for display to the user.

Map data may generally be stored in blocks known as map data tiles, where the number of map data tiles increases with zoom level. The remote processor provides a subset of the available map data tiles for a particular location or region to the mobile device for storage and display at any particular time via a map display application. By providing large numbers of map data tiles, the mobile device may buffer the map data for display to the consumer as the consumer scrolls across an area using the mapping application looking for adjacent or other mapping locations. However, the larger the number of map data tiles provided at any particular time increases the download time and buffer memory usage while the user is using the map display application.

Map data tiles may be downloaded and cached in an inefficient manner that may not take advantage of differences in a threshold level of map data necessary to render different portions of a map surface at different viewing angles. This may be especially true when rendering a three-dimensional map having a viewing window that is tilted at an angle that exposes various viewing depths of the map surface. As a result, there is a need to have more intelligent mechanisms for retrieving (e.g., downloading) and/or rendering map data, in particular map data tiles, to sufficiently satisfy visual requirements of a three-dimensional map without wasting bandwidth and processing services.

SUMMARY

A computer-implemented method for rendering a map on a display device determines a viewing window of a map surface, the viewing window defined as at least a portion of a viewing plane, wherein the viewing plane is at an angle of incidence with respect to the map surface. The method determines a first unit of area on the map surface that is rendered at a first zoom level. The method determines a projection of a depth along the map surface of the first unit of area as a height on the viewing window at a non-zero angle of incidence and at the first zoom level. The method determines a depth boundary along the map surface where the height projection of the depth of the first unit of area is lower than a threshold at the non-zero angle of incidence and at the first zoom level. The method renders the first unit of area within the depth boundary and a second unit of area outside the depth boundary. The first unit of area is rendered at a first density of map data and the second unit of area is rendered at a second density of map data that is lower than the first density of map data.

In one embodiment, the threshold is a height of one pixel of a the viewing window or display screen. In one embodiment, the depth boundary is a depth where the height projection of the depth of the first unit of area matches a height projection of the depth of the second unit of area.

In one embodiment, the depth boundary is based on a ratio of the height projection of the depth of the first map unit to a height of one pixel of the viewing window. In one embodiment, wherein the depth boundary is determined using the equation $Y_s = (Z, D_y/D_m, T)$, where $Y_s$ is the depth along the map surface, $Z$ is a zoom level, $D_y/D_m$ is the height projection of the depth of the first map unit to an incremental height of the viewing window, and T is the angle of incidence between the viewing plane and the map surface.

In another embodiment, a computer device includes a communications network interface, one or more processors, one or more memories coupled to the one or more processors and a display device coupled to the one or more processors. The one or more memories include computer executable instructions that are executed on the processor to determine a viewing window of a map surface, the viewing window defined as at least a portion of a viewing plane, wherein the viewing plane is at an angle of incidence with respect to the map surface. The computer executable instructions are executed to determine a first unit of area on the map surface that is rendered at a first zoom level. The computer executable instructions are executed to determine a projection of a depth along the map surface of the first unit of area as a height on the viewing window at a non-zero angle of incidence and at the first zoom level. The computer executable instructions are executed to determine a depth boundary along the map surface where the height projection of the depth of the first unit of area is lower than a threshold at the non-zero angle of incidence and at the first zoom level. The computer executable instructions are executed to render the first unit of area within the depth boundary and a second unit of area outside the depth boundary. The first unit of area is rendered at a first density of map data and the second unit of area is rendered at a second density of map data that is lower than the first density of map data.

According to another embodiment, a computer device includes a communications network interface, one or more processors, one or more memories coupled to the one or more processors and a display device coupled to the one or more processors. The one or more memories include computer executable instructions that are executed on the processor to receive information defining a viewing window of a map surface, the viewing window being at least a portion of a viewing plane that is at an angle of incidence with respect to the map surface. The computer executable instructions are executed to determine a first unit of area on the map surface that corresponds with a pixel of the viewing window when the map surface is rendered at a first zoom level using first zoom level map data and the viewing plane is at a zero angle of incidence with respect to the map surface. The computer executable instructions are executed to determine a second unit of area on the map surface that corresponds with a pixel of the viewing window when the map surface is rendered at a second zoom level using second zoom level map data and the viewing plane is at a zero angle of incidence with respect to the map surface. The computer executable instructions are executed to determine a projection of a depth along the map surface of the first unit of area as a height on the viewing window at a non-zero angle of incidence and at a magnification of the first zoom level, wherein the first zoom level map data is of higher density than the second zoom level map data. The computer executable instructions are executed to determine a depth boundary along the map surface where the height projection of the depth of the first unit of area is lower than a threshold at the non-zero angle of incidence and at the first zoom level magnification. The computer executable instructions are executed to create an image of the map surface wherein the first unit of area is disposed within the depth boundary and the second unit of area is disposed outside the depth boundary. The computer executable instructions are executed to transmit the image of the map surface.

BRIEF DESCRIPTION OF THE DRAWINGS

FIGS. 15A-E illustrates a portion of the viewing plane and map plane of FIG. 14 at different tilt angles.

DETAILED DESCRIPTION

A technique for reducing an amount of map data to be retrieved and processed by a computer device when displaying a map in tilt view determines a plurality of depth bands for displaying a map surface and uses different zoom level data for rendering the map within each depth band. The technique recognizes differences in zoom level data needed to render the bands and selectively retrieves different zoom level data for each band. Because each set of zoom level data corresponds to different densities of map data (a zoom level corresponding to a specific number of map data tiles per unit area), rendering a portion of a map surface at lower zoom levels reduces data and processing requirements for rendering the map surface. The technique allows the computer device to select only necessary levels of map data (zoom level data) for each section of the map to reduce the total amount of map data retrieved and/or processed.

Figure 1:
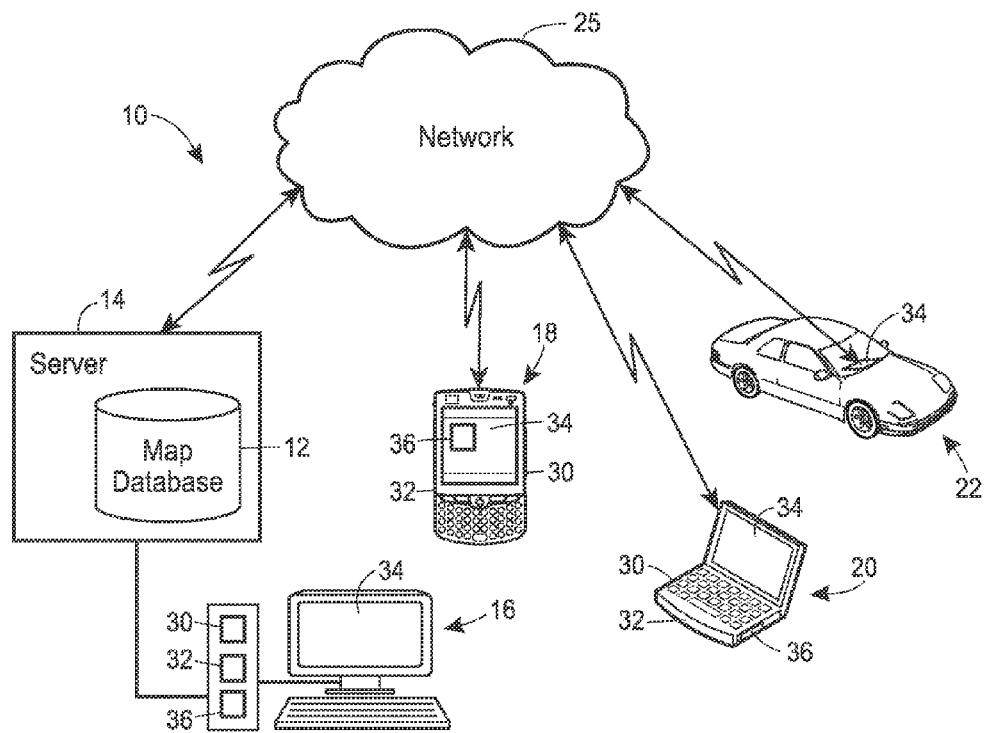
FIG. 1 is a high-level block diagram of a map imaging system that implements communications between a map database stored in a server and one or more map image rendering devices.

Referring now to FIG. 1, a map-related imaging system 10 includes a map database 12 stored in a server 14 or in multiple servers located at, for example, a central site or at various spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a laptop, desktop or other types of computers (16, 20) or components of other imaging systems such as components of automobile navigation systems (22), etc. Moreover, the client devices 16-22 may be communicatively connected to the server 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. Generally speaking, each of the image objects defined by the vector data will have a plurality of vertices associated therewith and these vertices will be used to display a map related image object to a user via one or more of the client devices 16-22.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 operates such that a user, at one of the client devices 16-22, opens or executes a map application (not shown in FIG. 1) that operates to communicate with and to obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
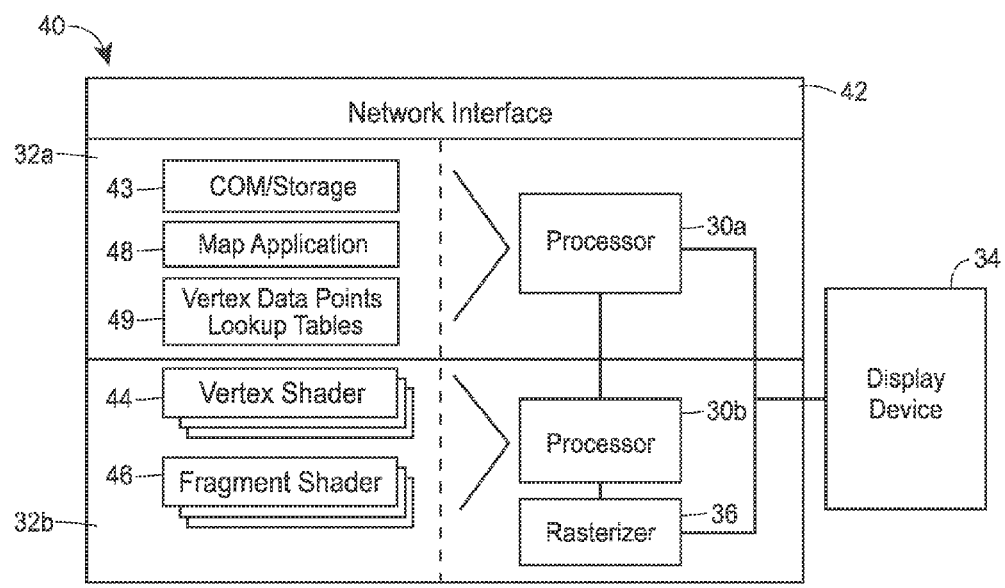
FIG. 2 is a high level block diagram of an image rendering engine used to render map images using map vector data.

Referring now to FIG. 2, an image generation or imaging rendering device 40 associated with or implemented by one of the client devices 16-22 is illustrated in more detail. The image rendering system 40 of FIG. 2 includes two processors 30a and 30b, two memories 32a and 32b, a user interface 34 and a rasterizer 36. In this case, the processor 30b, the memory 32b and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one or more map applications 48 having map display logic therein stored on the memory 32a, which may be executed on the processor 30a. Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders are executed on the processors 30a and 30b to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory for example, that stores vector data received from the map database 12, the vector data including any number of vertex data points and one or more lookup tables as will be described in more detail.

During operation, the map logic of the map application 48 executes on the processor 30 to determine the particular image data needed for display to a user via the display device 34 using, for example, user input, GPS signals, prestored logic or programming, etc. The display or map logic of the application 48 interacts with the map database 12, using the communications routine 43, by communicating with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30a. In one embodiment, the image data sent from the server 14 includes vector data generally defining data for each of a set of vertices associated with a number of different image elements or image objects to be displayed on the screen 34 and possibly one or more lookup tables. If desired, the lookup tables may be sent in, or may be decoded to be in, or may be generated by the map application 48 to be in the form of vector texture maps which are known types of data files typically defining a particular texture or color field (pixel values) to be displayed as part of an image created using vector graphics. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables downloaded and stored in the data memory 43.

Figure 3:
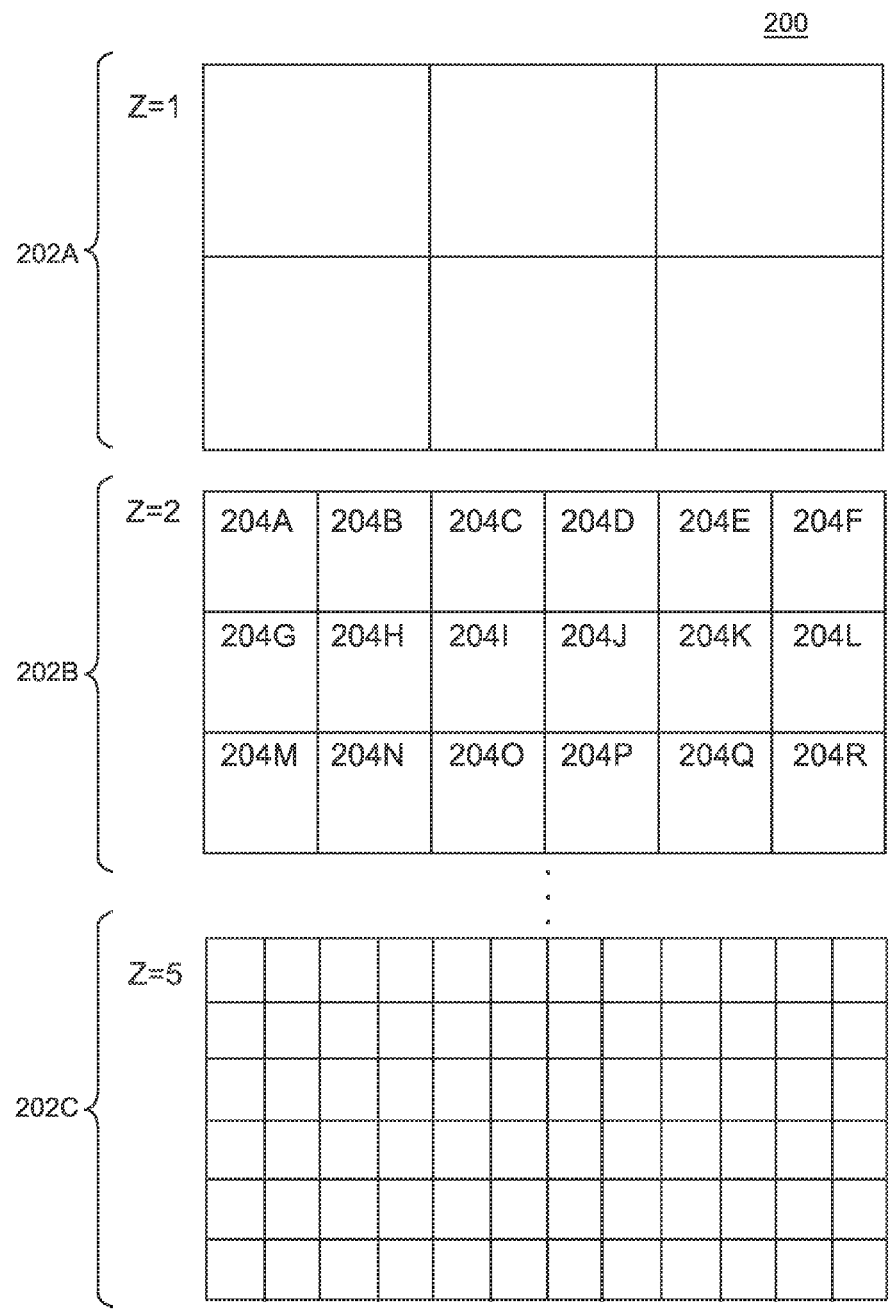
FIG. 3 illustrates a portion of a data structure that can be used in the map database of FIG. 1.

Generally speaking, map data in the map database 12 for a particular geographic region may be stored in different zoom levels, where each zoom level is formed of a plurality of map data blocks, termed map data tiles, which are used to construct a visual display of the map at different levels of detail. FIG. 3 illustrates an example data structure 200 of a portion of the map database 12. The map data for a particular geographic region is stored in numerous (n) different zoom level data structures (only three of which are shown) 202A, 202B, and 202C, where each data structure is formed by a plurality of map data tiles. The data structure 202B, which is the only one numbered for explanation purposes, shows the map data for the particular or fixed geographic region at zoom level, $z=2$, which is formed of 18 map data tiles, 204A-204R. The map data tiles represent the basic building blocks for constructing a map display. Each map data tile contains necessary map data to construct a portion of the map display, including data identifying various map objects or map features such as roads, buildings, and geographic boundaries, such as water lines, county lines, city boundaries, state lines, mountains, parks, etc. The map data for a geographic region may be stored in any number of different zoom level data structures to provide different levels of detail for the particular geographic region. In an embodiment, 19 total zoom levels are stored in the map database 12.

The number of tiles for a fixed geographic region at each zoom level increases, e.g., linearly, quadratically, exponentially, or otherwise as the zoom level number increases. The zoom levels in the illustrated example ($z=1$, 2, and 5) have 6, 18, and 60 map data tiles, respectively, covering the same geographic area or region. Because the number of map data tiles increases for the same area as zoom level increases, zoom level may be considered a density of map data corresponding to a number of tiles per unit area. Higher zoom levels generally require more tiles per unit area and thus provide higher map data density over lower zoom levels.

In the illustrated embodiment, all map data is stored in map data tiles, and each map data tile in a zoom level data structure is allocated the same or similar memory allocation size. For example, each tile 204A-204R may be a bitmap image 10 Kbytes in size. This may be achieved, for example, by having each map data tile cover the same sized geographic area. For map data tiles containing vector data, the data size for each tile may vary, but each tile may still, in some embodiments, be allotted the same maximum memory space. Although not illustrated, in other embodiments, the data tiles may have different memory space allocations within each zoom level data structure. In some embodiments, each map data tile contains map data stored in a bitmap format while in other embodiments the map data tile may contain map data stored in vector format.

Figure 4A:
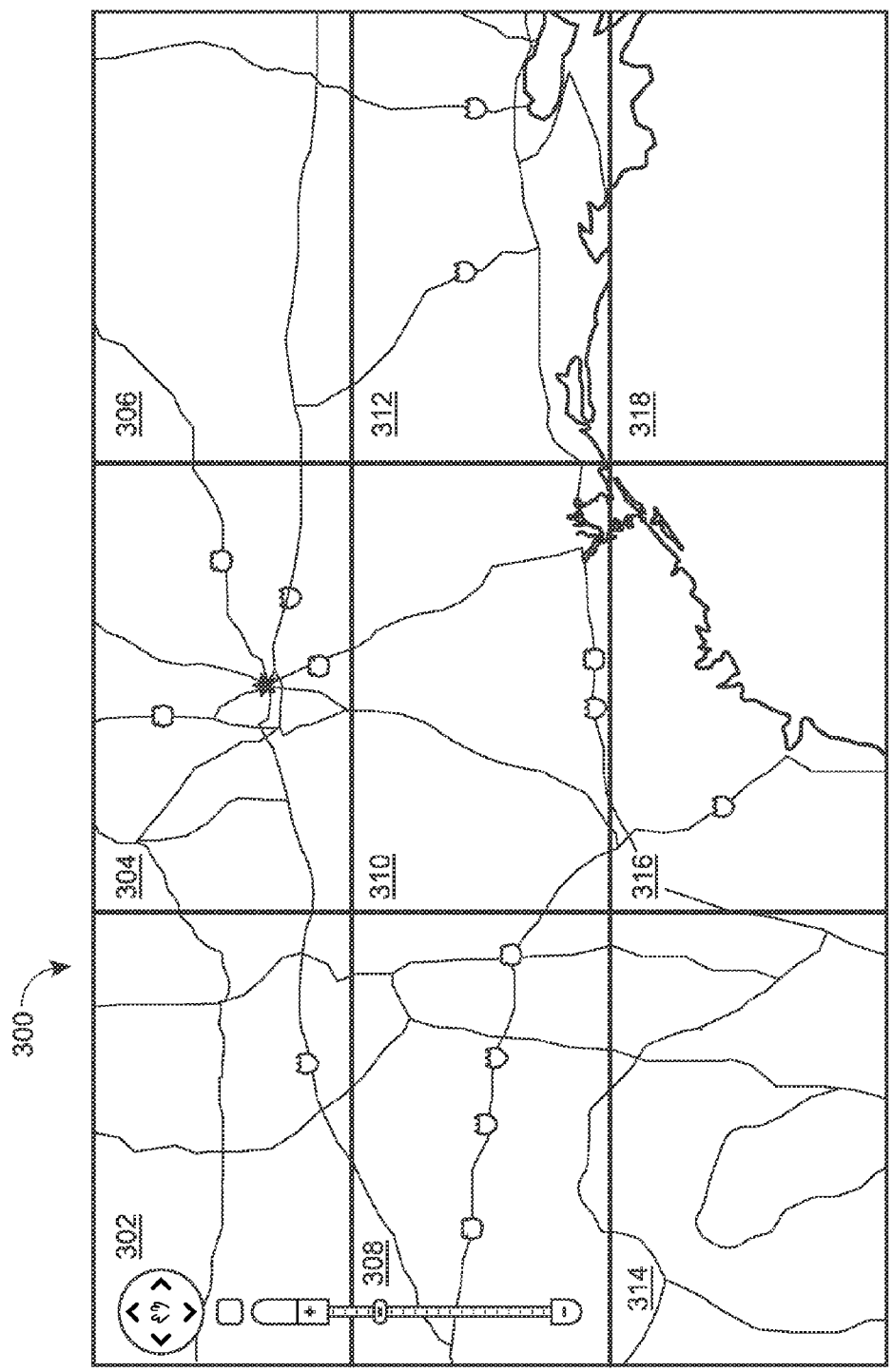
FIGS. 4A, 4B, and 4C illustrate example renditions of map data at three different zoom levels, respectively.
Figure 4B:
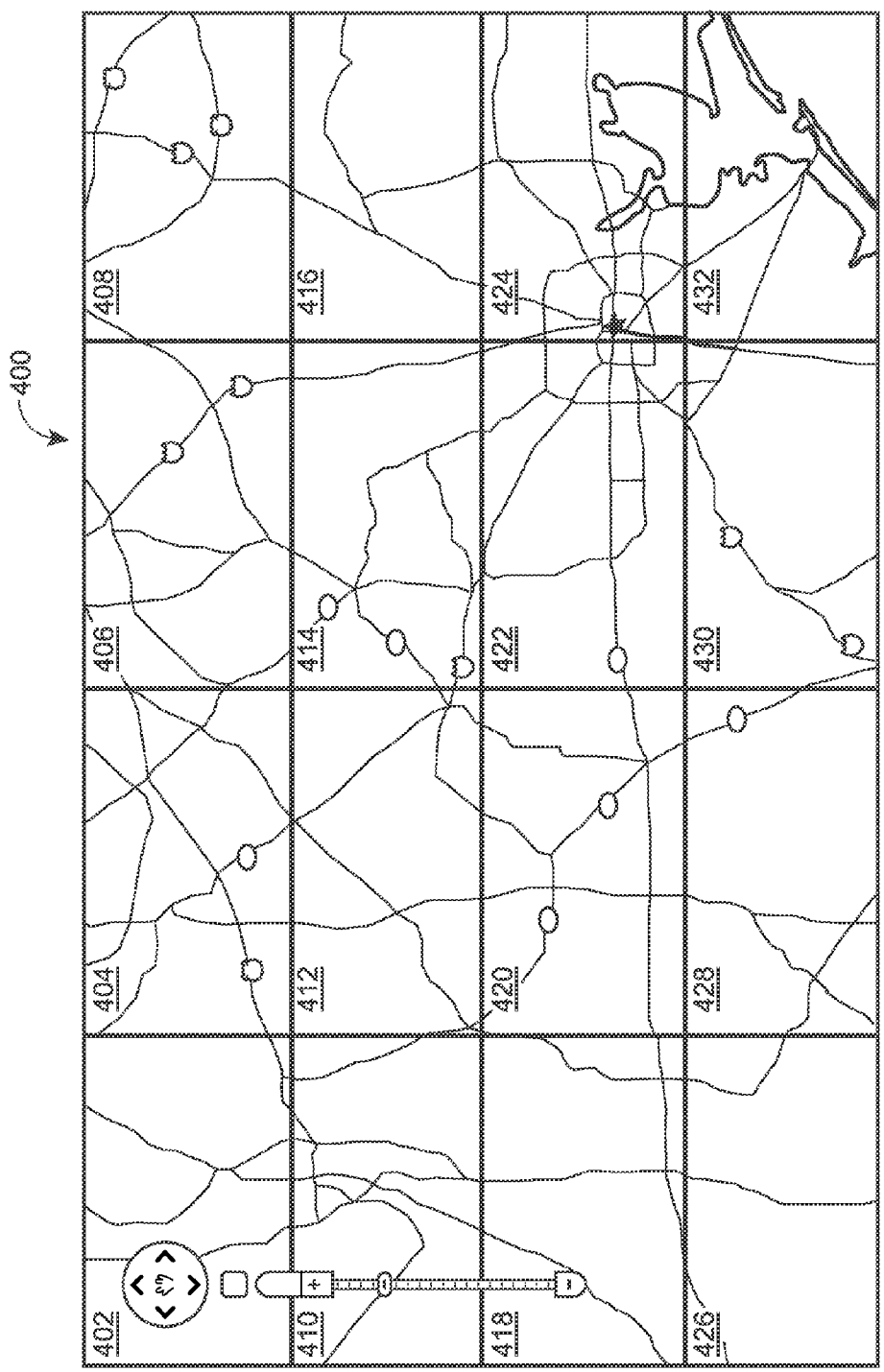
Figure 4C:
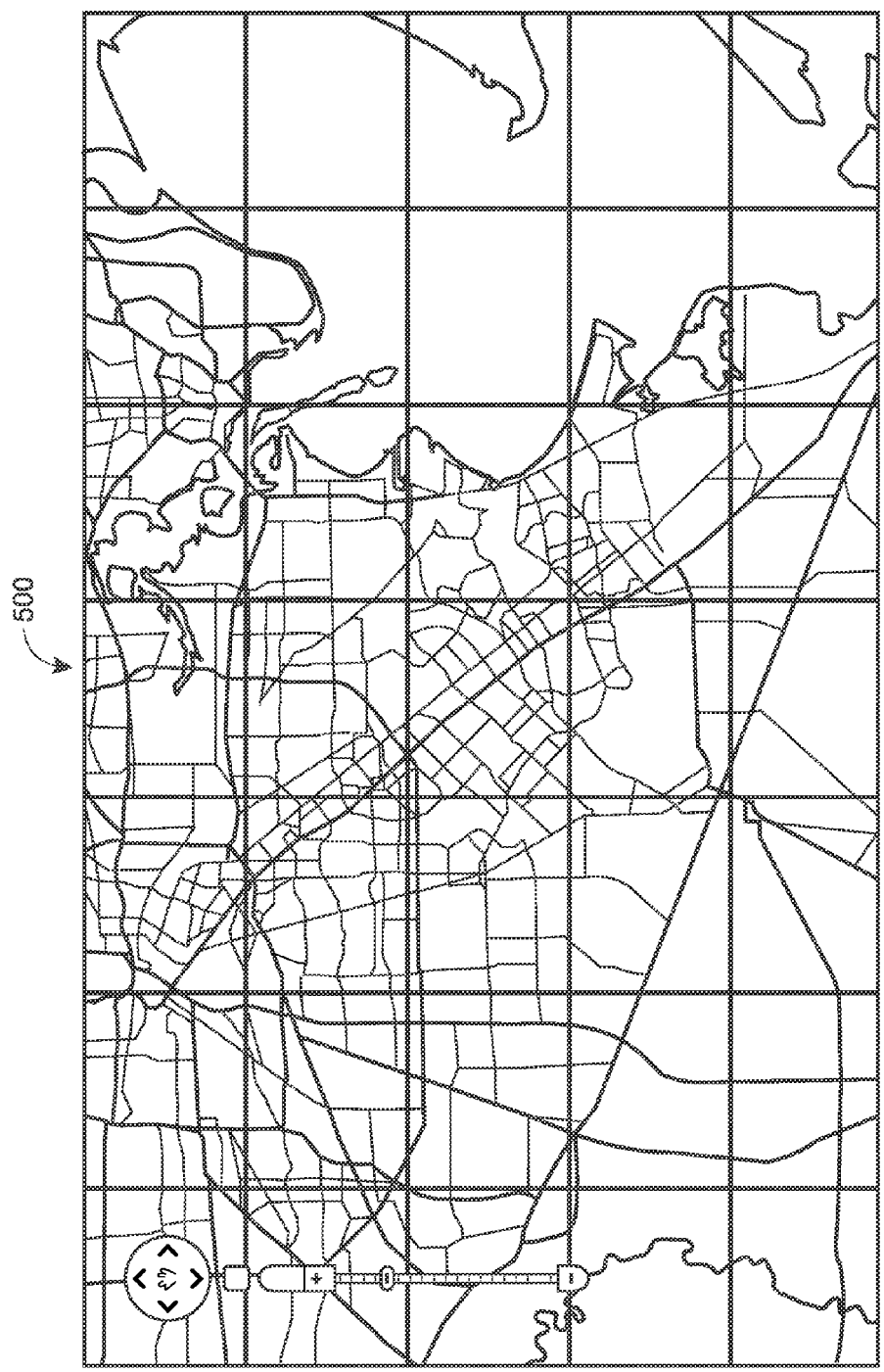

FIGS. 4A-4C illustrate visual map displays, e.g., that may be fully or partially displayed on the user interface 134, where each figure provides a visual display at a different zoom level. In the illustrated embodiments, FIG. 4A provides a visual map display 300 at an example zoom level, $z=6$, constructed of a series of map data tiles 302-318, which cover the same size geographic area and which have the same amount of memory size.

In operation, the server 14 is able to transmit map data to respective clients 16-22 in chunks of data defined by these map data tiles. For example, to transmit the map data needed to construct the map display 300, the server 14 may transmit each map data tile in a frame, having a header portion providing identification data of the frame (such as geographic position, client device address, map data tile version number, etc.) and a payload portion containing the specific map data tile data to be used in forming the visual display. Map data tiles provide an effective mechanism for quantizing map data stored in the map database 12 and for quantizing communication of the map data over the network 25 to the clients 16-22.

In comparison to FIG. 4A, FIG. 4B illustrates a visual map display 400 at a zoom level higher than the zoom level of FIG. 4A, in this example zoom level, $z=10$. The map display 400 is formed of a plurality of map data tiles 402-432. Like the map data tiles 302-318, the map data tiles 402-432 are each the same in size, e.g., covering the same size of a geographic area and having the same memory size. FIG. 4C illustrates another visual map display 500 at a third even higher zoom level, zoom level $z=12$, formed of map data tiles.

Each of the displays 300, 400, and 500 is a portion of the overall map data, which comprises many more map data tiles. As illustrated across FIGS. 4A-4C, the map data tiles that form each visual map display have various levels of detail. The tiles 302-318 illustrate geographic boundaries, but no roads, only highways and/or interstates, while the tiles of FIG. 4C are at a higher zoom level and contain information on roads, buildings, parks, end points, etc.

As the zoom levels increase, i.e., as the visual map display of fixed size focuses down on a smaller geographic region, the amount of map data may reach a maximum point, beyond which all zoom levels will contain the same map data. The number of map data tiles needed to construct a map display may vary but the total amount of map data becomes saturated. The zoom level corresponding to this point is termed the saturation zoom level and represents the zoom level at which all roads, building, parks, end points, and other map data elements for a geographic region are provided. Any additional zoom levels selected by the user merely magnify further these existing map data elements without retrieving additional map data tiles. In the illustrated example of FIGS. 4A-4C, zoom level, $z=12$, represents the saturation zoom level.

While a user interacts with the visual map displays 300, 400, and 500, the user may wish to scroll around to display other map data near the illustrated map data. Therefore, the client device 16-22 uses a system to fetch and store a sufficient amount of map data to form the visual map display while buffering additional map data at the client device 16-22 to allow efficient user interaction with that display.

In computer mapping applications, a viewing window may correspond to a view of an imaginary camera directed at a mapped surface. For example, the position of the viewing window may correspond to a physical position of a camera with respect to a surface, and, more particularly, a surface to be depicted as a map, where the viewing window direction generally corresponds to the direction of the camera (e.g., line of sight) towards the map surface.

Figure 5:
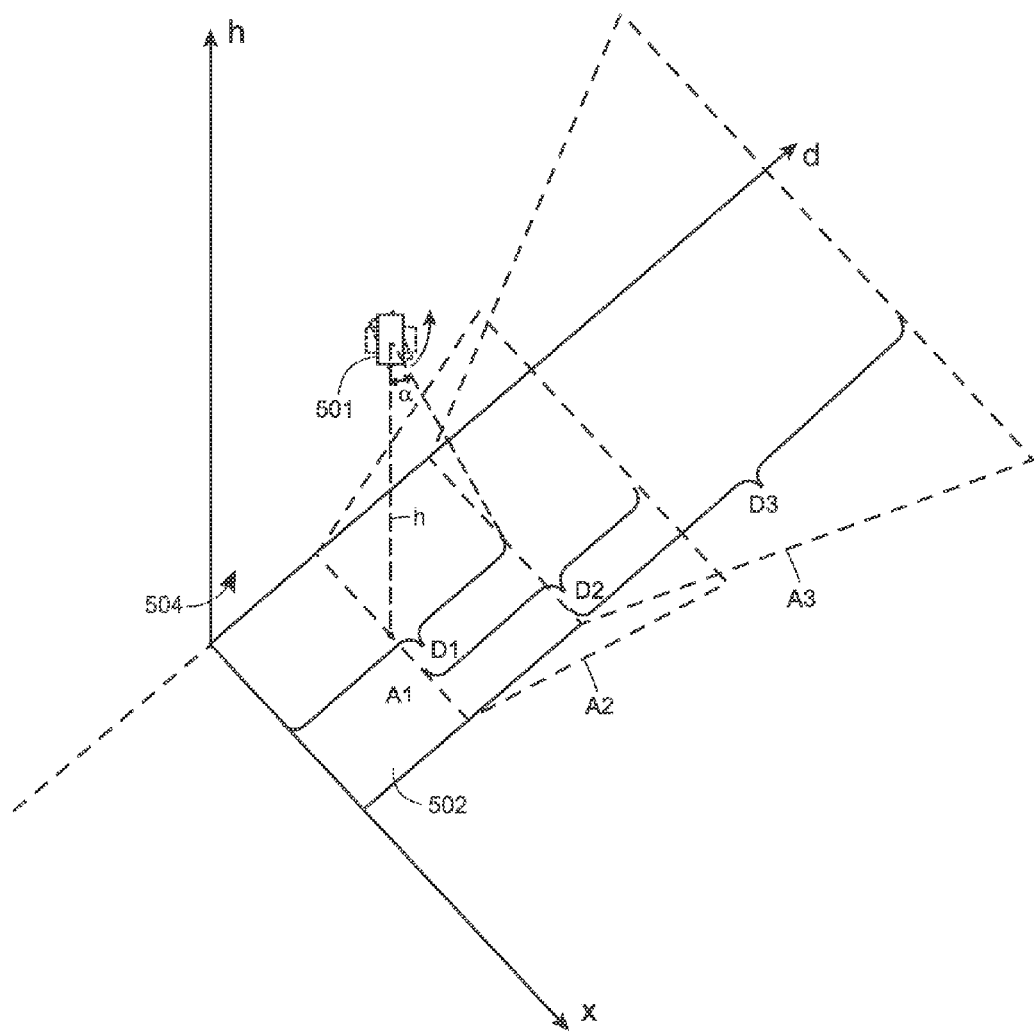
FIG. 5 illustrates viewing window manipulations from a camera over a map plane.

FIG. 5 illustrates a camera 501 positioned at a height h over a planar surface 502 defined by dimensions x and d. The camera is able to tilt or rotate along a plane 504 defined by dimensions d and h. An angle of the camera 501 away from a straight line down towards plane 504 along the h dimension provides an angle of incidence alpha. Changing the angle of incidence (alpha) by tilting the camera 501 exposes a different area of the map surface to the viewing window. In particular, for the plane 502 illustrated in FIG. 5, a zero-angle of incidence may display an area A1 of the planar surface 502, a first tilt angle (non-zero angle of incidence) may display an area A2 of the planar surface 502, and a second tilt angle (greater than the first tilt angle) may display an area A3 of the planar surface 502. For a fixed camera position, and thus, a fixed viewing window position, each change in viewing window direction from tilting exposes a different area A1 to A3 defined by a corresponding depth range D1 to D3 where D1 is closest to the camera position or viewing window position and D3 is furthest from the viewing window position.

Generally speaking, the techniques for rendering a three-dimensional tilt map involve determining a viewing window of a map surface, determining a set of depth bands of the map surface displayable within the viewing window, and selectively using map data from different zoom levels to render the map surface for each of the depth bands where a foreground depth band may use higher zoom level data than each subsequent depth band, until the last or background depth band that uses a lowest zoom level data.

Figure 5A:
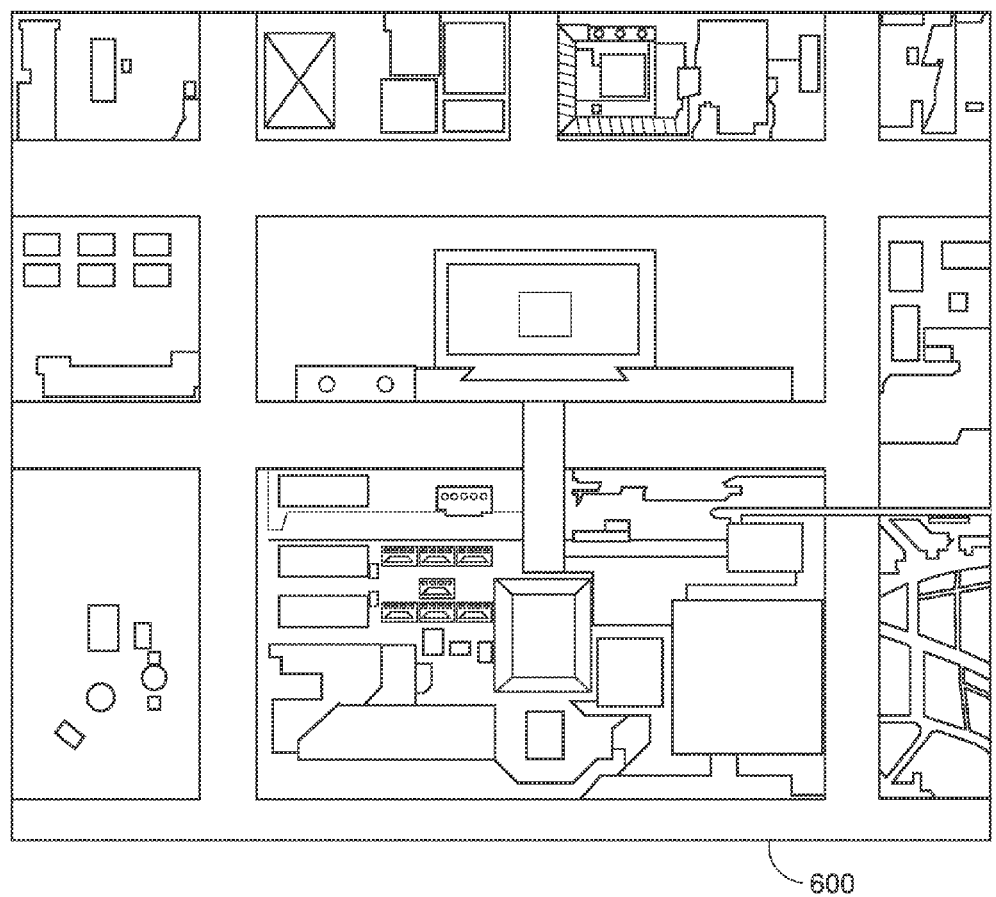
FIGS. 5A, 5B, and 5C illustrate example renditions of map data at three different tilt angles.

FIG. 5A illustrates a top-down perspective of a map surface 600. The viewing window of FIG. 5A may correspond to the camera view of area A1 in FIG. 5 where a camera is position over the map surface at a particular altitude or height where the viewing direction is at a zero angle of incidence. Map surfaces such as that illustrated in FIG. 5A are generally defined by a viewing window having a size and magnification level in addition to a position and direction as discussed above.

The top-down view of FIG. 5A is provided on a viewing screen that may be defined by a physical size of a display device, for example a physical size of a display screen, or by a display application executed on the display device where only a portion of the physical size of the display screen is used to display the map surface. For example, some mapping applications may reserve a portion of the display screen for rendering other map data, or to provide computer system information external to the mapping application.

Further, an area of the map surface viewable on the display screen may depend on a magnification of the viewing screen. The magnification of the viewing window may describe a scale upon which the map surface is being rendered. Maps are generally drawn to a scale, expressed as a ratio such as 1:1,000, meaning that 1 of any unit of measurement on the viewing window corresponds exactly or approximately to 1,000 actual units. For example, in a case in which a viewing window is measured in inches, the distance scale may translate an inch of the viewing window to a length of 1,000 miles (or kilometers). While a scale is not shown, FIG. 5A is drawn to a particular magnification or scale.

Analogous to changing a zoom level on a camera, some computerized maps allow users to zoom in or zoom out (generally meaning to increase or decrease the scale) of a map surface, where the zoom level generally corresponds to a magnification. However, depending on the mapping application, there may be a difference in the function of zoom level and magnification level. In some mapping applications changing a zoom level may involve simply changing a magnification or scale without using additional map data to redraw or to re-render the map. In mapping applications such as those using the techniques described herein, changing a zoom level may involve both changing a scale and retrieving additional map data (e.g., additional map data tiles for a given area) to re-draw a portion of the map with more data (usually involving more feature data) and thus, greater detail. As an example, when increasing magnification of a map surface without retrieving additional zoom level data tiles, a building represented as a block will simply be displayed as an enlarged block. When increasing magnification and retrieving additional zoom level data, the same building may be displayed as an enlarged block but with additional sub-features such as windows, columns doors, etc.

Figure 5B:
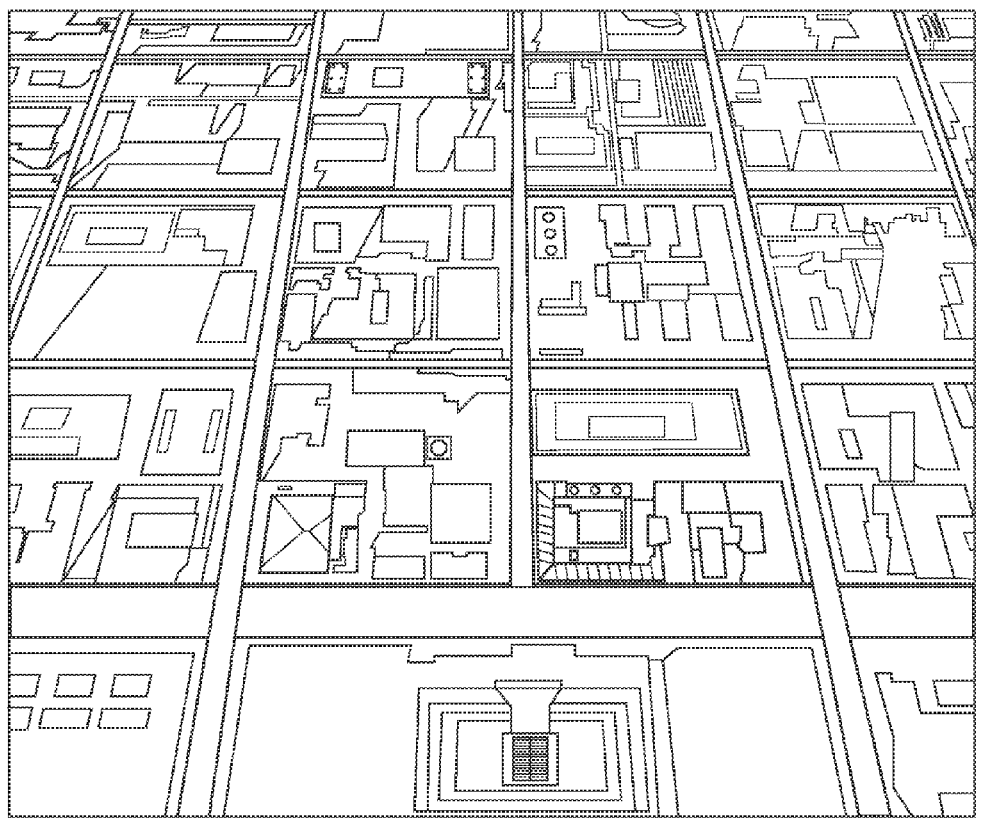

When referring to zoom level changes with respect to the techniques described herein, zoom level changes generally refer to zooming that retrieves additional map data or map data tiles. In any event, FIG. 5A illustrates a top-down perspective (also referred to as bird's-eye view, overhead view or helicopter view) of a map surface 600. This view may generally represent a common two-dimensional map without a depth perspective along the map surface. On the other hand, FIG. 5B illustrates a top-down perspective of the map surface wherein the direction of the viewing window has been tilted upwards (relative to the map surface) such that the viewing angle of incidence is non-zero. The viewing position and magnification of FIG. 5B is the same as that of FIG. 5A. Similarly, FIG. 5C illustrates a top-down perspective of the map surface wherein the direction of the viewing window has been tilted even further than that of FIG. 5B, but wherein the viewing position and magnification remains unchanged from FIGS. 5A and 5B.

Figure 6A:
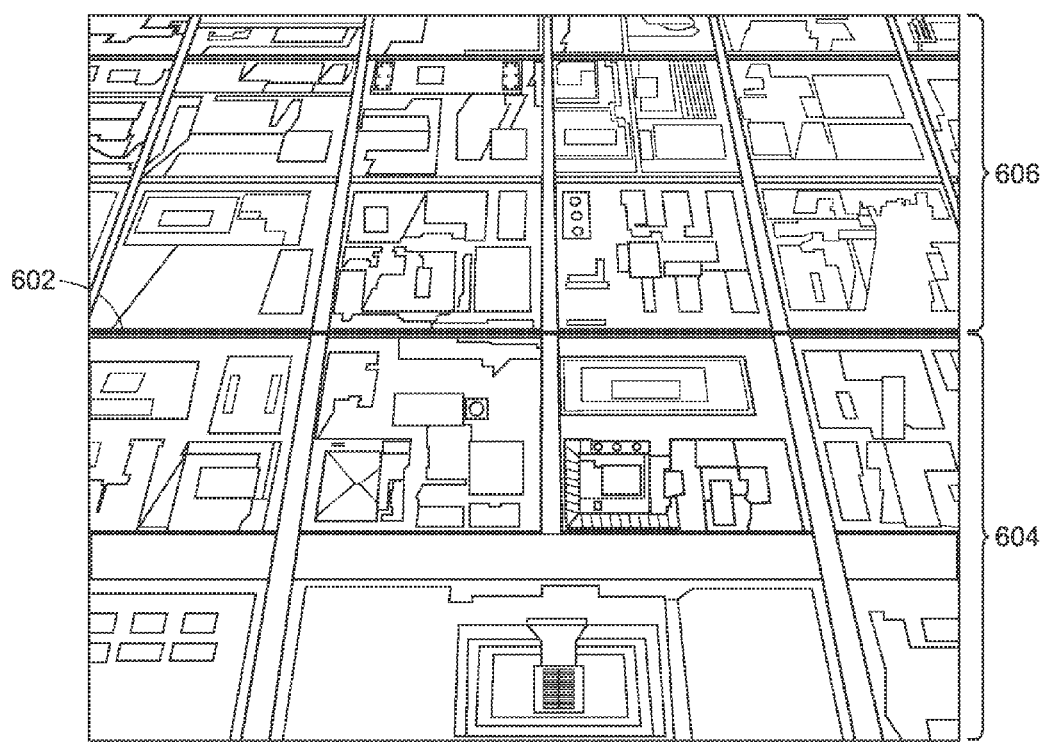
FIGS. 6A and 6B illustrate example renditions of map data at different tilt angles and include boundaries for defining different viewing bands.

FIG. 6A illustrates a top-down perspective having a slight angle of incidence similar to that of FIG. 5B with a band boundary 602, dividing the screen into depth bands 604, 606 each corresponding to a separate area of the map. The depth bands may be used to demarcate subareas of the map surface where different levels of map data may be used to render or display the map. In one embodiment, map data used to render the foreground band 604, may use higher zoom level data (e.g., more map tiles per unit area) than the map data used for background band 606. As shown in FIG. 6A, this may be perceived as a more detailed (higher resolution) foreground image than the background image. Because less map data is being retrieved for the background than the foreground, the process used to render FIG. 6A may require less processor capacity and less fetching of data than retrieving single high density data for both the background and foreground.

Figure 5C:
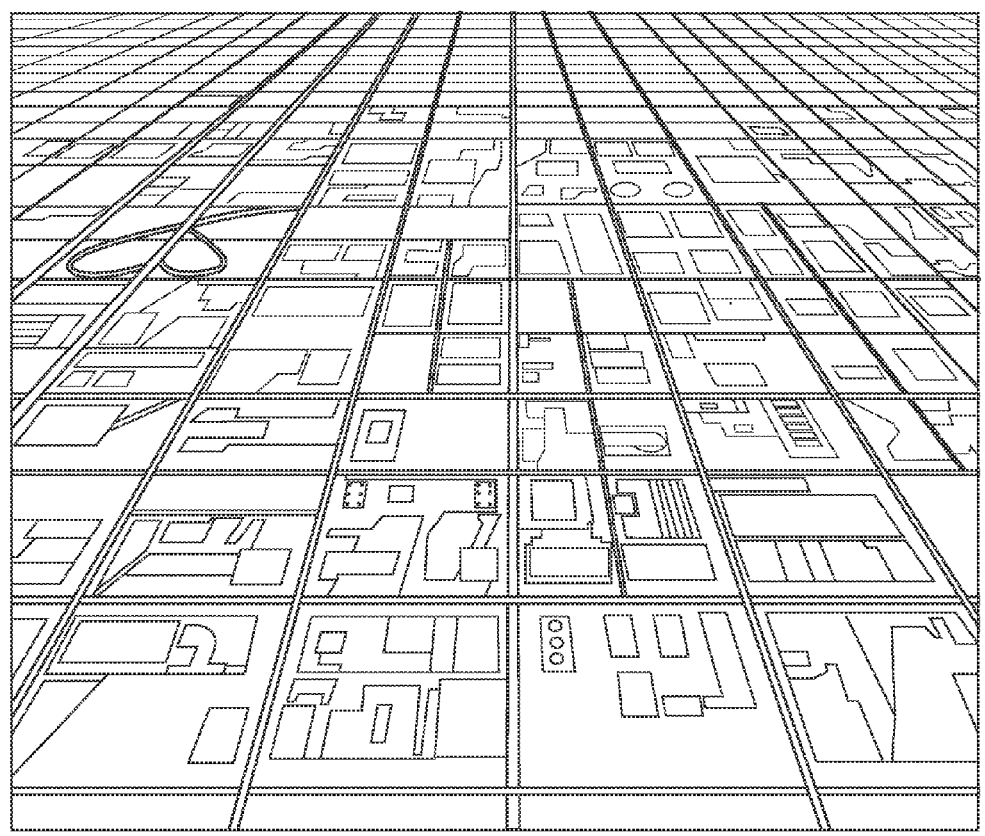
Figure 6B:
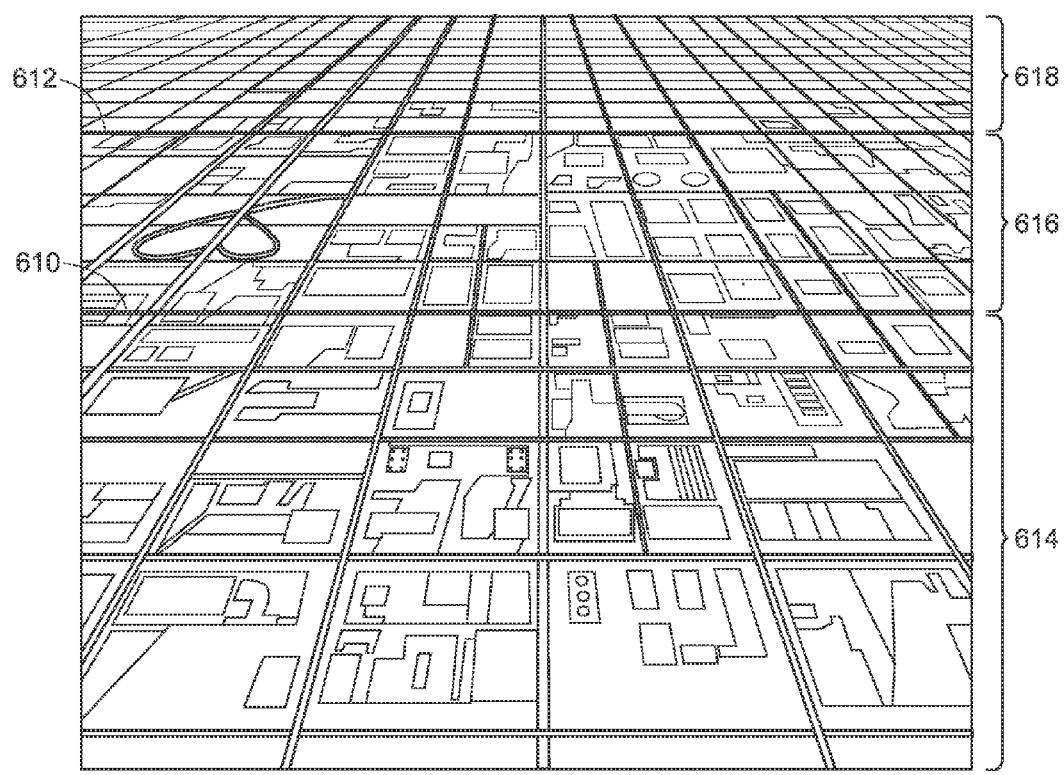

FIG. 6B illustrates a top-down perspective having a greater angle of incidence than FIG. 6A and is similar to the view of FIG. 5C with two band boundaries 610, 612 dividing the screen into depth bands 614, 616, 618 each corresponding to an area of the map. The viewing position and magnification are the same as for FIG. 6A, wherein only the viewing direction (angle of incidence) is changed. Similar to FIG. 6A, map data of differing densities may be used to render each band of FIG. 6B. High density, higher zoom level map data may be used to render the foreground band 614 than is used in each subsequent band 616, 618, where low data density, low zoom level map data is used to render background band 618. Intermediate band 616 may have a zoom level and density of map data in between those of upper band 614 and the lower band 618. It should be noted that while FIGS. 6A and 6B illustrate only two and three bands, respectively, other views consistent with the methods and system described herein may involve more than three bands.

Some mapping applications may generally fetch a constant level of map data (e.g., same high zoom level map data tiles) for an entire view (foreground as well as background) regardless of whether the amount of feature detail provided by the level of map data is necessary to render map detail as visually satisfactory for a map user at all displayed depths. Unlike these mapping applications, the above described process renders the viewing window with multiple zoom level data containing different densities of data. This may provide a cost savings in terms of bandwidth and processing time when compared to a system that renders an entire displayable map surface area using a single (generally high) map density data.

Figure 7:
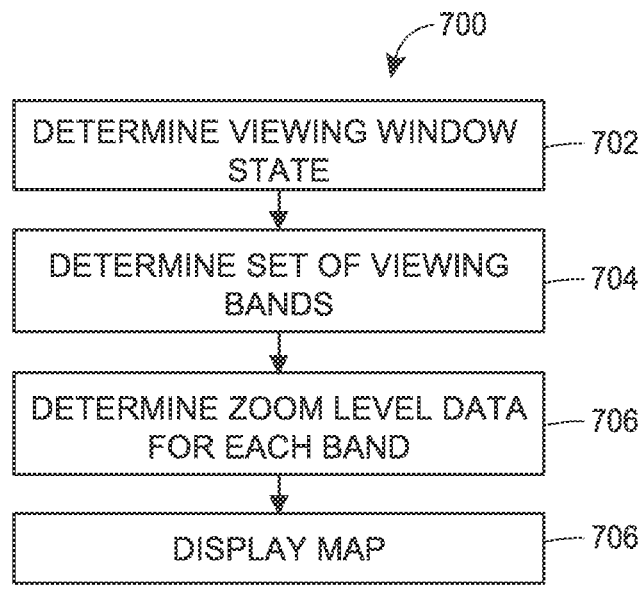
FIG. 7 illustrates a process flow diagram of a process for rendering a map surface such as those of FIGS. 6A and 6B.

FIG. 7 illustrates a process flow diagram or flow chart of a method, routine, or process 700 that may be used to render a map surface such as those illustrated by FIGS. 6A-6C. Generally, speaking, the routine or process 700 may be implemented as one or more software routines or applications, including routines that are part of the map application 48. These routines may be implemented or written in any desired language, such as Javascript, C code, etc. and may be executed on one or more of the processors 30a and 30b of FIG. 2. Additionally, these routines may use the rasterizer 36 to render an image on the display device 34.

In any event, a block 702 may determine a viewing window state with respect to a map surface to be displayed. This viewing window state may include a viewing window size, a viewing window position, a viewing window direction and a magnification level for a view of a map surface. This determination may be made by receiving an input from a user of a computer device. For example, the user may input a particular longitude, latitude, and altitude, as well as a zoom level corresponding to a magnification level and a viewing angle (i.e., a viewing direction). In some embodiments, the determination may be made based on a pre-stored value for an initial rendering of a map location (e.g., an initial view of a city landmark or popular city feature) or may be based on pre-stored settings that are based on user preferences.

A block 704 may then determine a set of viewing boundaries and corresponding viewing bands of the map surface displayable on the determined viewing window. The boundaries may be designated as a depth with respect to the position of the viewing window. The boundaries may divide the map surface into the plurality of viewing bands (areas or volumes) based on a depth dimension range. A closest range band may represent a foreground of the displayed map surface while a furthest range band may represent a background of the displayed map.

A block 706 may then determine and/or obtain zoom level data for each of the plurality of determined viewing bands for rendering each viewing band. With respect to the mapping system using vector data and map data tiles described above, block 706 may determine a zoom level set of map data tiles for each determined band. As discussed above, a set of tiles for a zoom level will have a certain density as measured by map data tiles per unit area. Thus, block 706 may determine a density of map data tiles for each band. In embodiments that may not use discrete map data tiles, block 706 may determine a density of map data for each band. A block 708 may render, draw, or otherwise display the map surface of the determined viewing window as the set of viewing bands using the determined zoom level data (or map density data) to render each band.

As discussed above, map data of a higher zoom level generally provides more resolution and more feature data than map data of a lower zoom level. Thus, in embodiments where the foreground has higher zoom level data than each subsequent viewing band, each subsequent band may have progressively less map detail and/or resolution. It should be noted that resolution in this sense refers to an amount of map data (or map data tiles) or the density of map data used to provide map features at a particular magnification of the viewing window.

The block 704 may determine the viewing bands by considering a number of factors including prior mapping situations or conditions. For example, in one mapping situation, a top-down perspective of a map surface at a zero angle of incidence may be initially rendered on a viewing window. This map view may correspond to a common view of a two-dimensional map. In this case, data from a single zoom level may be used to render the entire surface of the displayed map as there is no variable viewing depth. In other words, at a zero angle of incidence, the map surface is parallel to the viewing window. When the map application allows for subsequent tilting of the viewing window direction, the view of the map surface changes so that a foreground is at one perceived depth range while a background is at a different perceived depth range.

In one embodiment, additional map surface area exposed (or to be displayed) when viewing window angle of incidence is increased may be demarcated as a second depth band where the first depth band includes map surface area that was originally rendered prior to the tilting. In this manner, only the second depth band may be rendered using additional zoom level data (generally lower zoom level data or lower density map data). Map data fetching and processing may thus be reduced since at least a portion of the view is already pre-rendered and cached and any additional portion of the view is rendered using lower zoom level data.

FIGS. 6A and 6B illustrate that as the angle of incidence is increased, existing portions of previously rendered map areas may no longer be displayed and additional zoom level data may be determined, fetched and processed for displaying the foreground or background bands. It should be noted that even when a map view is rendered without prior rendered or prior cached map sections, the process may still provide bandwidth and processor savings because there is still a data difference between rendering an entire displayable map surface area using a single (generally high) map density data and displaying only portions of a displayable map surface with high density map data while displaying other portions with low density map data.

In some embodiments, block 706 may determine that a foreground band is assigned a higher level of zoom data (high density or high definition map data) than each subsequent band (having greater depth range) using lower zoom level data. A last band or background band may use a lowest zoom level data among a set of bands displayed. In variable notation, for each set of consecutive bands B1 to Bn, where B1 is a foreground band having a depth dimension D1 and Bn is a background band having depth range Dn, each set of bands B1 to Bn may be rendered with a corresponding zoom level of data Z1 to Zn, where Z1 is a highest level zoom data with the greatest density of map data such that B1 has zoom level Z1, B2 has zoom level Z2, and so on until band Bn has corresponding zoom level Zn. Accordingly, D1 has the closest depth range with respect to the viewing window depth position (the viewing window depth position is generally zero depth) and Dn is the furthest depth range with respect to the viewing window position.

In another embodiment, the block 704 may determine one or more additional range transition viewing bands disposed in between major bands. For example, in the illustrations of FIGS. 6A and 6B, additional range bands may be disposed near or at the boundaries 602, 610, and 612. These bands may be used to render a smoother transition between larger bands (e.g., between bands 604 and 606 or between bands 614, 616, and 618) to reduce abrupt changes in map feature density. Alternatively, a plurality of bands may be determined by block 704 where each band is determined to have only an incremental change in densities going from a foreground band to a background band to reduce abrupt visual changes in the map rendered. Determining the viewing bands and determining what level of zoom data to use for each viewing band may be based on a number of parameters. Some embodiments may separately determine viewing bands and zoom levels while other embodiments may base a determination viewing band on zoom level or vice versa.

One parameter for determining viewing bands and/or what level of zoom data to use for each viewing band may be based on a generally acceptable depth range for human perception of feature data. This range may be determined using a number of different thresholds such as Johnson's criteria, which describes minimum required resolution for human discrimination at various depths. Another parameter to use for determining viewing bands may be a resolution limit for a display screen of the display device. Retrieving or processing map features for a depth range that cannot be physically displayed on a monitor of a display screen may represent a waste of bandwidth and processing capacity. Moreover, it should be noted that the determined depth band dimensions may not be a constant size across each of the set of depth bands. Some depth bands may be narrower or larger depending on parameters such as the tilt angle or magnification.

In some embodiments, a middle band (i.e., not a foreground band and not background band) may have a higher zoom level data than a prior or subsequent band. This may be the case in situations where a feature that is in the middle of a map surface is to be highlighted. In this case, the band determination may be based on a set of map features. This determination may in turn be based on feature priority, type or position of the map features.

In some embodiments, additional higher zoom level data may be retrieved for a foreground band than is previously available from a prior rendering of a portion of the band. This may occur for example in situations in which a direct zero angle of incidence view provides very little information about a set of foreground features. In one embodiment, as the viewing angle is tilted slightly, a first depth range of the foreground requires greater detail than provided in a prior rendered zoom level view. In this case, additional higher level zoom data may be retrieved (e.g., from a database) and rendered for the foreground. In some cases, as the angle is tilted further, an initial highest zoom level of the foreground may be discarded and replaced with lower zoom level data. This situation may arise when there is sparse feature data for the foreground band when compared to the background band.

Moreover, a depth band may be partitioned based on a line of sight of features or map objects in the foreground. For example, where a building is positioned in the foreground band and the viewing window is close enough to the building such that much of the horizon of the view is obscured by the building, only portions within the line of sight of the viewing window may be rendered. Alternatively, only map data for map areas that are viewable within the line of sight range of the viewing window may be retrieved from a data store.

As the viewing window is tilted, the depth band dimension ranges may be adjusted accordingly for a current view. For example, for a constant viewing window size, position, and magnification, the viewable area of the map surface may extend further and further as the tilt angle is changed. In one embodiment, the foreground band may grow deeper as the tilt angle is increased, with each subsequent band adjusted accordingly. Generally, the size of the bands may be adjusted accordingly as the tilt angle is changed. Moreover, the number of bands may be increased or decreased as necessary to provide a visually satisfactory image.

Each of blocks 702-708 of FIG. 7 may be performed in a number of ways and by a number of different entities while remaining consistent with the techniques described herein. In one embodiment, where a database containing the map data is contained in a first computer, blocks 702-708 may be performed entirely on the first computer device.

Figure 8:
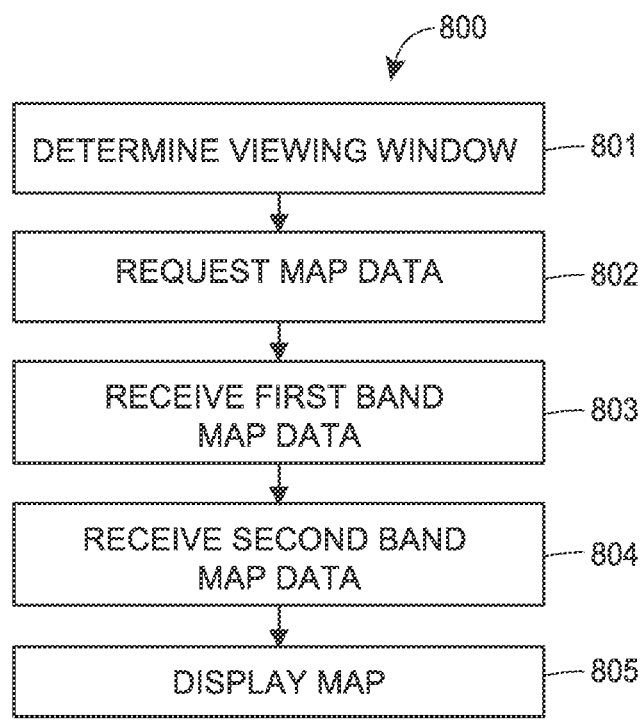
FIG. 8 illustrates a process flow diagram for a client computer device.

In other embodiments, the process blocks may be distributed among two or more computer devices. FIG. 8 illustrates a process flow where block 801 determines a viewing window state (size, position, direction, magnification) for a map surface at a first computer device. Based on this viewing window state, the first computer device (e.g., a client) may at block 802 communicate with a second computer device (e.g., a server) to request map data based on the viewing window state. The second computer device may determine a set of viewing bands as well as zoom level data for each viewing band. The second computer may then retrieve the corresponding map data and service the first computer device request by sending the corresponding map data to the first computer. The first computer device may receive the map data for its request as a first band data at a first zoom level (block 803) and second band data at a second zoom level (block 804). The first computer may then display the map at block 804 based on the received band and zoom level data. In an alternative embodiment, the second computer device may either retrieve the map data from a third computer or direct a third computer to send the corresponding map data to the first computer device.

Figure 9:
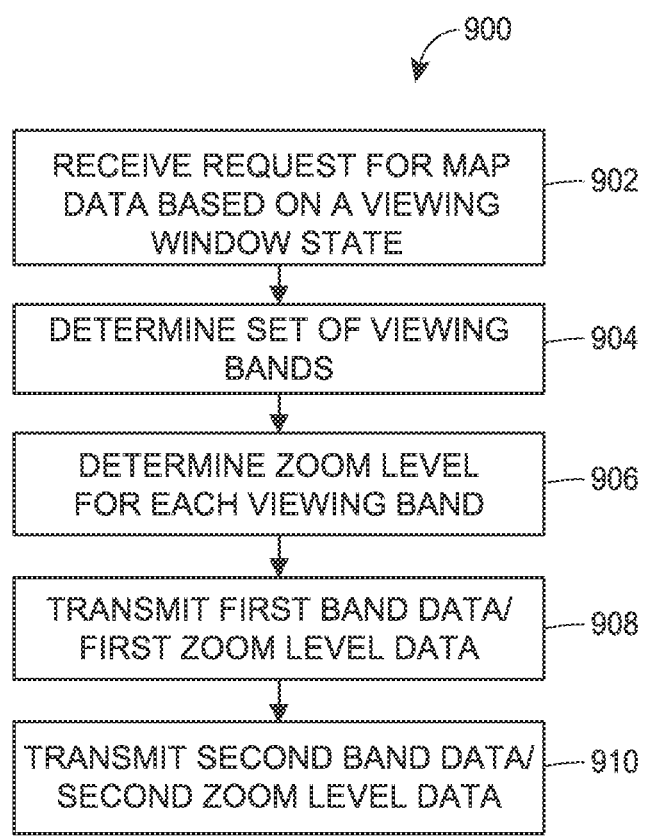
FIG. 9 illustrates a process flow diagram for a server computer device.

FIG. 9 illustrates a process flow from a server side. At block 902 a server receives a request for displaying a map surface on a viewing window. In some cases, no viewing window state may be received with the request. In such cases, the server may proceed based on a pre-determined or default viewing window state for a map surface or general map location. Block 904 may then determine a set of viewing bands of a map surface based on the viewing window state. Block 906 may determine zoom level data needed for each of the determined viewing bands. Blocks 908 and 910 may facilitate the transmission of the banding data and zoom level data to a requesting device or user. Additional blocks sending additional bands and zoom level data may be appended to the process.

The zoom level data and banding data of the process of FIG. 9 may be retrieved from a database contained by the server or from a database of a third computing device. In one embodiment, the server may retrieve the corresponding map data from the third device and then, in turn, send the map data to the requesting device or client. In an alternative embodiment, the server may direct the third computing device to send the corresponding map data to the requesting device or user. In another embodiment a portion of the corresponding map data is retrieved from a database of the server and a portion of the corresponding map data is retrieved from a database of the third party device. In another embodiment a portion of the corresponding map data is sent from the server and a portion of the corresponding map data is sent from a third party device.

In other embodiments, determining the banding may be performed by a first computer device while determining of what zoom level data is used to render the viewing bands may be performed by a second computer device. Map data in this configuration may be obtained by either a computer performing the determining block or a different computer. Of course, the map rendering techniques described herein may be altered or varied in any number of manners to provide the described map rendering system.

Figure 10:
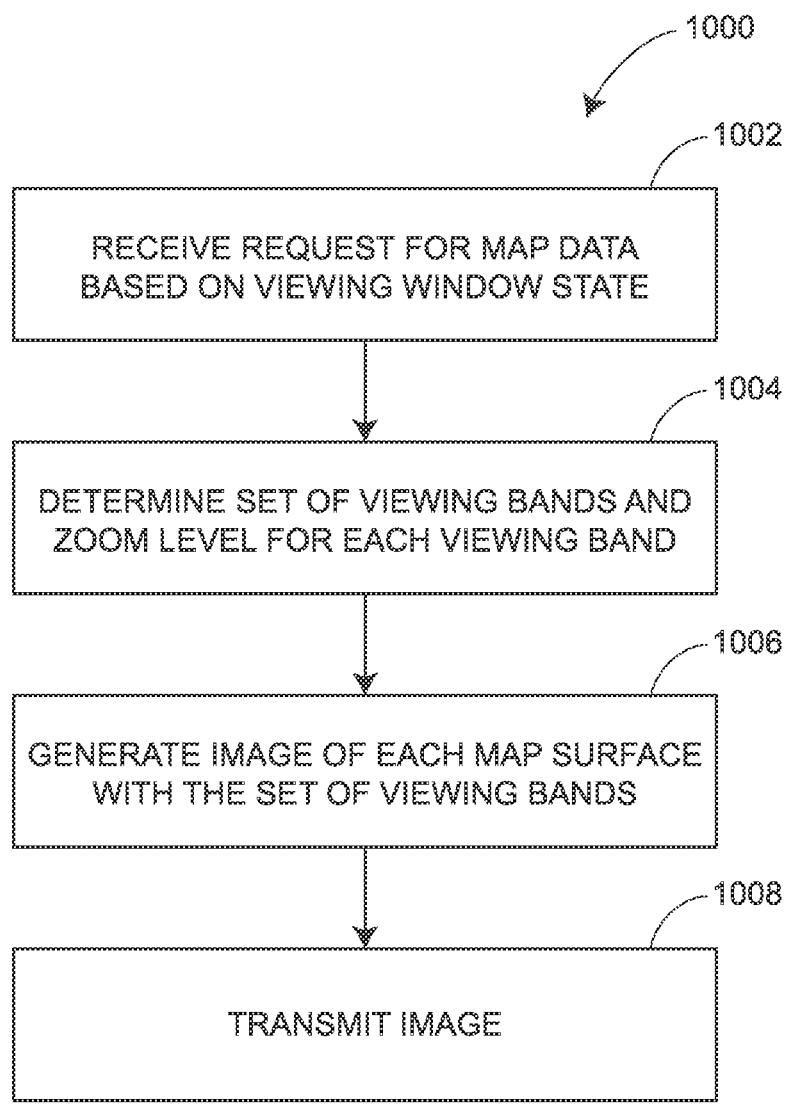
FIG. 10 illustrates a process flow diagram for a server computer device generating a map image for a client.

FIG. 10 illustrates another process flow for a server computer. A block 1002 may be programmed to receive a request for map data that may be used to display a map surface based on a received viewing window state. In some embodiments, a viewing window state may not be included with the request and the server may proceed based on a pre-determined or default viewing window state for a map surface or general map location. A block 1004 may determine a set of viewing bands and corresponding zoom level data for each of the set of viewing bands of the map surface based on the viewing window state. A block 1006 may generate or produce an image of the map surface based on the determined set of viewing bands. A block 1008 may then transmit the image to, for example, a client computing device for display.

The following sections describe details of possible combinations of the banding techniques described above with methods for determining projections of image areas on a display plane or display screen. The methods for determining projections may be used to adjust viewing bands.

Figure 11:
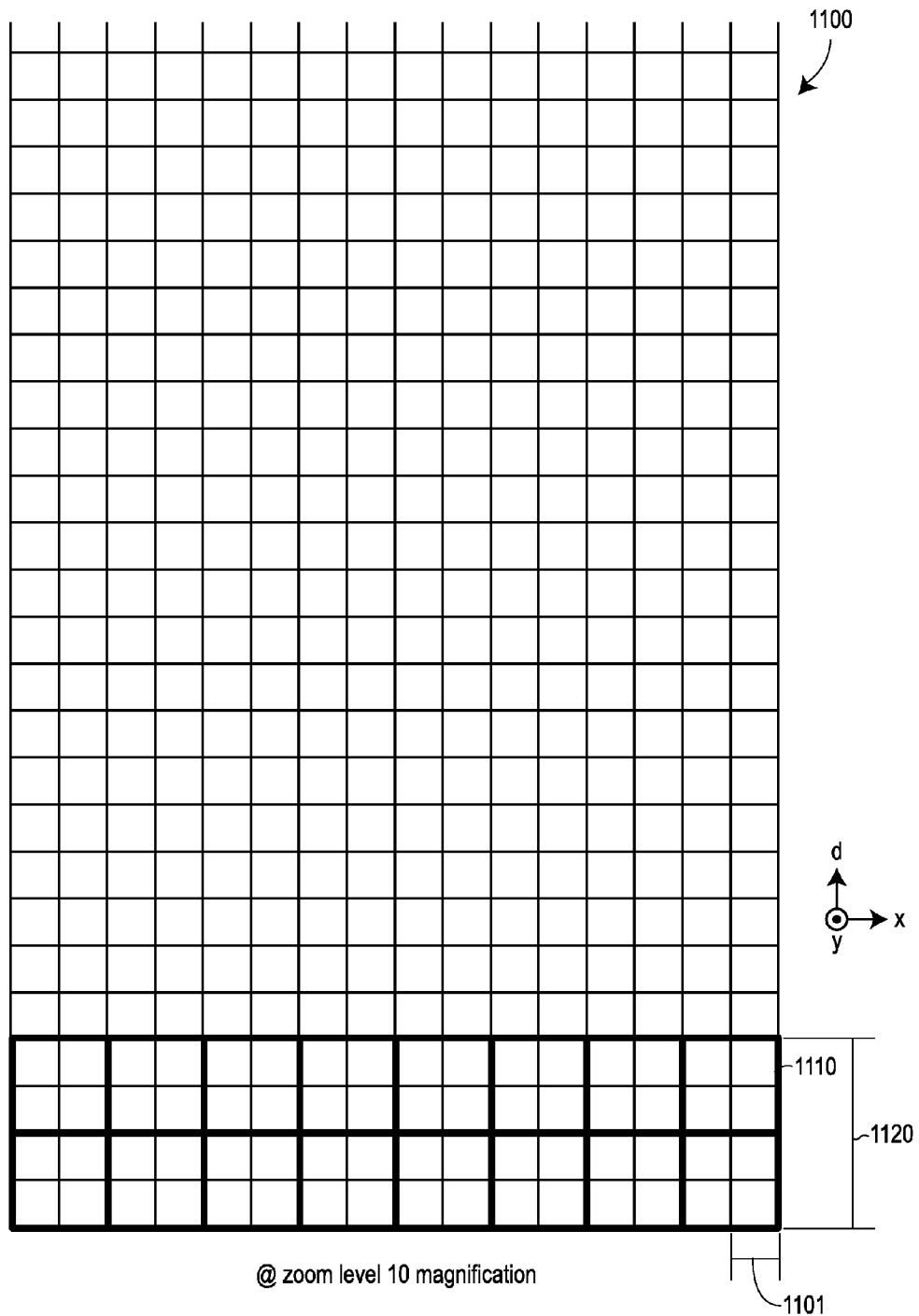
FIG. 11 illustrates an overhead view of a map surface at a zero tilt angle that may be rendered on a display device.

FIG. 11 illustrates an overhead view of a map surface 1100 at a zero tilt angle that may be rendered on a display device. This view is equivalent to a flat two dimensional map. Generally, a display device may render an image (e.g., a map surface image) using a two-dimensional grid (e.g., a viewing plane) of discrete picture elements called pixels 1011. A pixel 1011 may represent the smallest addressable element of a display device, where the address of a pixel generally corresponds to its coordinates on a screen of the display device. As discussed, map data may be organized as map data tiles, where each map data tile corresponds to an area of a map surface. FIG. 11 illustrates an implementation where each map data tile 1110 may be rendered using four pixels arranged as a 2×2 pixel square of the display device. Of course, other sizes of map data tiles different than the two pixel diameter size 1120 may be implemented in various embodiments. For example, in some embodiments a 256× 256 pixel square may be used to render a map data tile.

Generally, map data tiles of each zoom level may be scaled such that when they are rendered at a magnification that corresponds with their zoom level, they are rendered with the same display screen pixel size and area. Thus, in the embodiment of FIG. 11, each map data tile may be rendered as a 2×2 display screen pixel square when a magnification of the viewing window or display screen corresponds or matches with a zoom level of the map data tile. For example, when zoom level 10 map data tiles are rendered on a display screen at a magnification that corresponds to zoom level 10, each of the map data tiles may be 2×2 display screen pixels. The same scaling may apply to map data of zoom level 9. In particular, zoom level 9 map data tiles are also each 2×2 display screen pixels when rendered at a magnification that corresponds to zoom level 9. It follows that FIG. 11 illustrates a layout of map data tiles (i.e., as 2×2 display screen pixel squares) of any zoom level when the magnification of the display screen or viewing window corresponds to the zoom level of the displayed map data tiles. Accordingly, the number of map data tiles shown may be limited primarily by the physical size of the display screen (e.g., a display screen of 640×480 may only have as many as 320 map data tiles across and 240 map data tiles high) or by a viewing window designating only a portion of the entire display screen.

Figure 12:
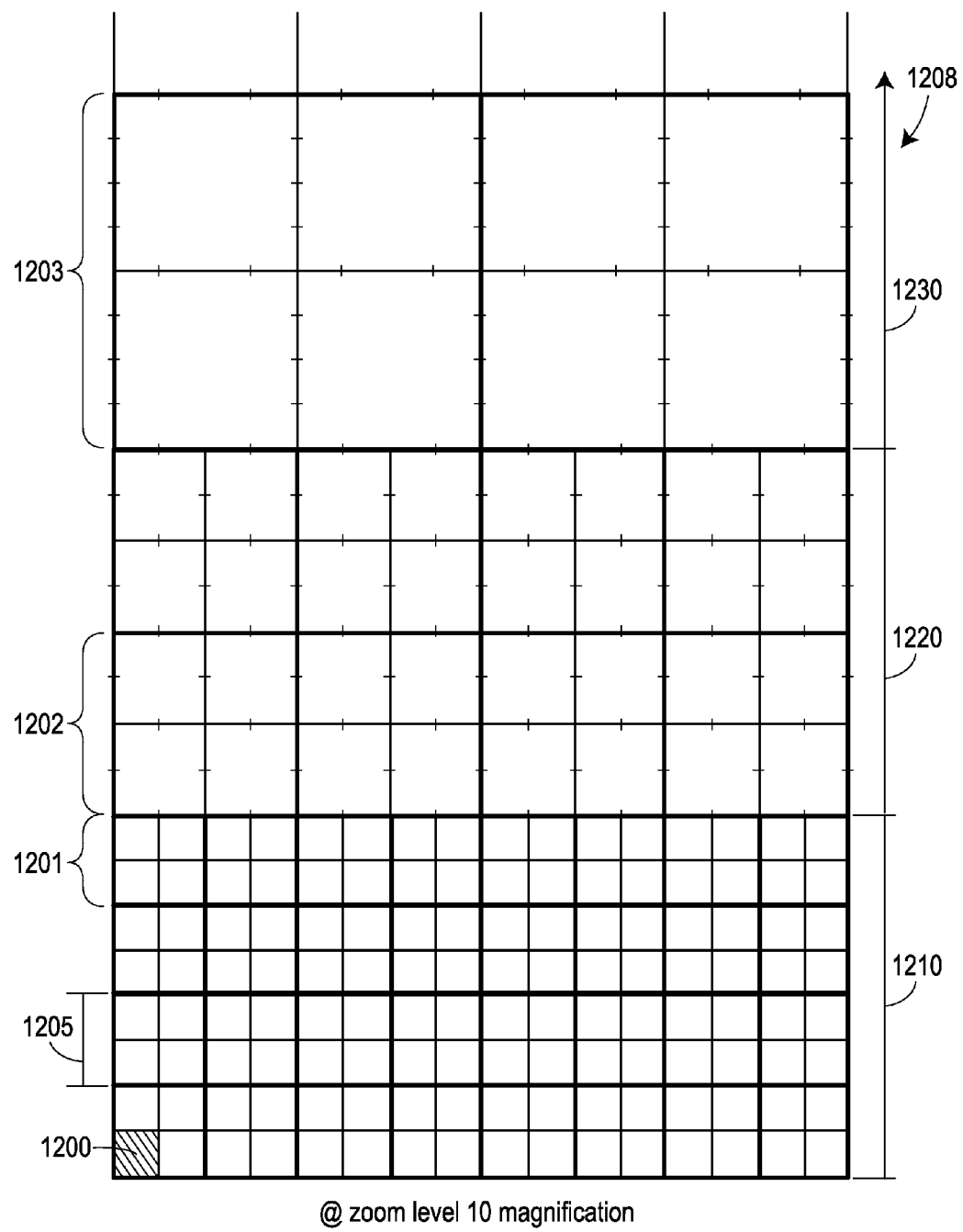
FIG. 12 illustrates an overhead view of a map surface at a zero tilt angle having map data tiles of different zoom levels.

In some situations, map data tiles of a first zoom level may be rendered at a magnification that is different from the magnification that corresponds to the first zoom level. In this situation, the display size of the map data tiles (e.g., the number of display screen pixels used to render the map data tiles) may be sized differently than at a magnification corresponding to the first zoom level. FIG. 12 illustrates a view of map data tiles of different zoom levels displayed at the same time according to one embodiment. The map data tiles of FIG. 12 are rendered on a display screen at a single magnification, and thus, not all the map data tiles of other different zoom levels may be the same size in terms of display screen pixels.

Figure 13:
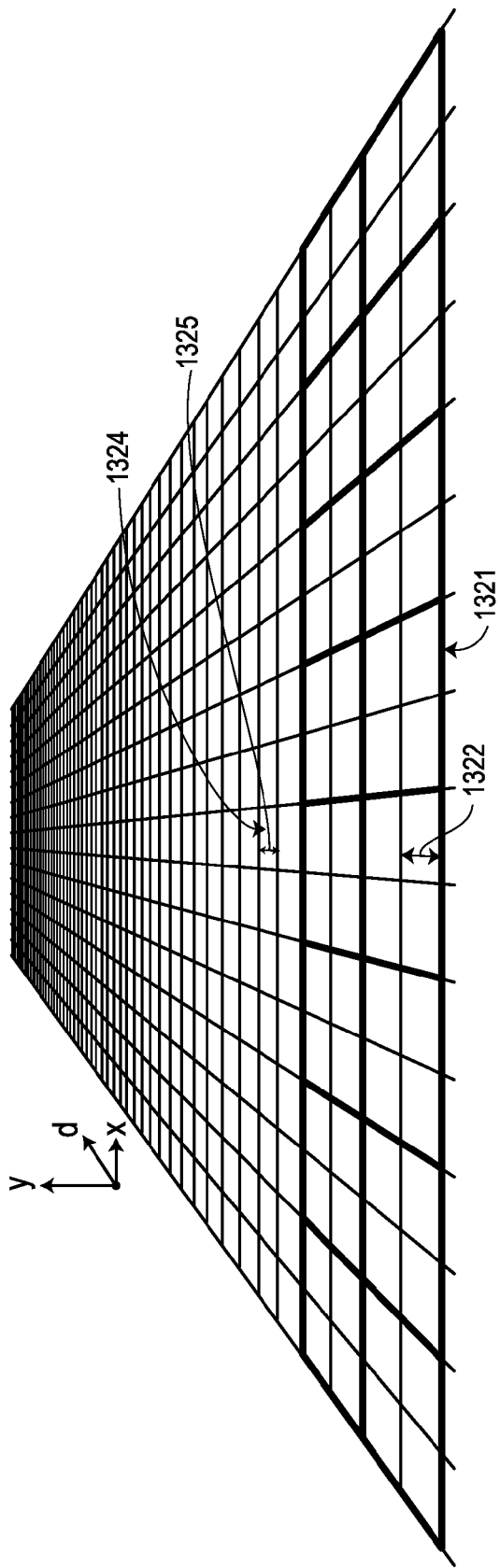
FIG. 13 illustrates a tilt view of a map surface using map data tiles from a single zoom level.

For example purposes, FIG. 12 may illustrate a map surface 1208 rendered at a zoom level 10 magnification and map data tiles 1201 of a first area 1210 are zoom level 10 map data tiles. The map surface 1208 is rendered using a plurality of display screen pixels 1200. The first area 1210 of the map surface comprises a plurality of map data tiles 1201 that are each 2×2 display screen pixels in size (having a diameter 1205). A second area 1220 of the map surface 1208 may be rendered using map data tiles 1202 of a lower zoom level 9. In line with the current example, if the map data tiles of zoom level 9 were rendered at a magnification corresponding with zoom level 9, they would be rendered similar in size to those of area 1210 where each map data tile would be 2×2 pixel squares. However, the view of FIG. 13 is being rendered at zoom level 10 magnification. Thus, zoom level 9 map data tiles may be rendered larger than zoom level 10 map data tiles at zoom level 10 magnification. In this embodiment, each subsequent zoom level corresponds to a 2× magnification of a precedent zoom level. Thus, the map data tiles of zoom level 9 rendered at a magnification of zoom level 10 are rendered as 4×4 square pixels at a magnification of zoom level 10. A third area 1230 of the map surface 1208 may be rendered using map data tiles 1203 of a lower zoom level 8. Because of the 2× magnification between zoom levels, the map data tiles 1203 of zoom level 8 rendered at a magnification of zoom level 10 are 8×8 square pixels, or twice the dimensions (4 times the size) of the zoom level 9 map data tiles. Generally, lower magnification map data tiles may correspond to larger areas of a map surface than higher zoom level map data tiles. Consequently, a larger number of map data tiles of a higher zoom level may be required to represent the same actual map surface area as map data tiles of a lower zoom level. It should be noted that while map data of different zoom levels are disposed adjacent one another in FIG. 12, the scaling is such that the distances along the plane of the map surface remains the same even when crossing between different zoom level map data tiles. For example, even when a map feature traverses two different zoom level data tile areas (e.g., 1210 and 1220), the depth along the map surface remains proportional.

Figure 14:
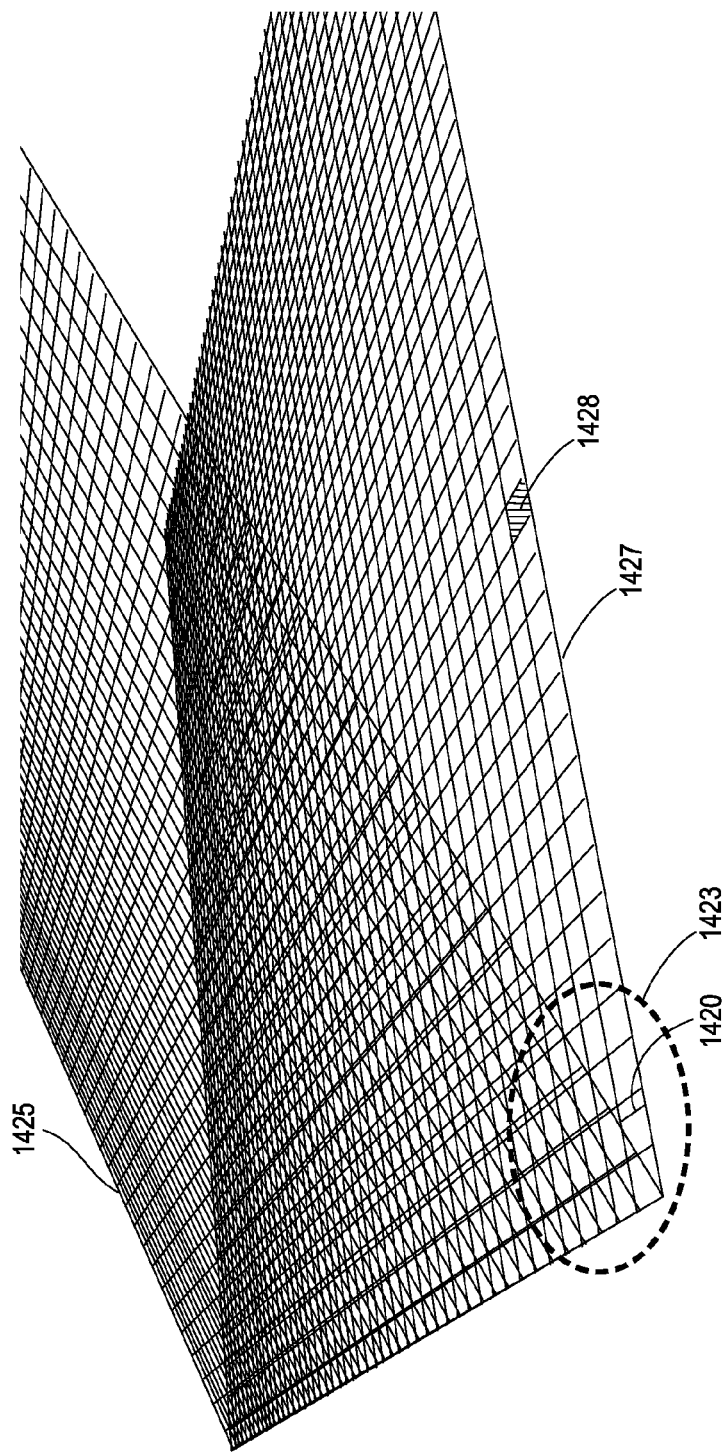
FIG. 14 illustrates a perspective of a viewing plane and a map plane at an angle.

FIG. 13 illustrates the map surface of FIG. 11 at a non-zero angle of incidence. In FIG. 13, all the map data tiles are of a single zoom level and are rendered at a magnification corresponding to the zoom level. For example purposes, FIGS. 11 and 13 may represent a display of zoom level 10. Because of the tilt angle, there is an added dimension of depth (d) to the map surface. This depth dimension is rendered as a two dimensional projection of the map surface on to a plane represented by a viewing window (or display screen). FIG. 14 may better illustrate that a viewing plane 1425 of a viewing window that is at an angle 1420 with a plane 1427 representing the map surface. A viewing window may be a portion of the viewing plane 1425. The angle 1420 may be proportional to an angle of incidence. When the angle 1420 is zero (corresponding to a zero angle of incidence), and the two planes are aligned, then a viewing window of the viewing plane 1425 may render the map plane as a view similar to FIG. 11. When the angle 1420 is non-zero, the viewing window of the viewing plane 1425 may provide a view similar to FIG. 13.

When the viewing plane 1425 and map plane 1427 are at an angle (tilt), same sized areas of the map plane 1428 may be projected on to the viewing plane 1423 as different sized areas. Generally, the projection of the map surface on to a viewing window (representing a portion of the viewing plane) may be such that areas of the map surface that are closer to a position of the viewing plane 1425 (or a portion of the viewing plane) are rendered larger than the areas of the map surface further from the position of the viewing plane 1425. In particular, FIG. 13 illustrates that a pixel 1321 that is proximate a position of the viewing plane would be projected on to the viewing plane with a display screen height 1322 that is larger than a pixel 1324 with a display screen height 1325 that is distal from a position of the viewing plane.

FIGS. 15A-D illustrate a portion 1423 of the two planes 1425, 1427 of FIG. 14 for different tilt angles but rendered at a zoom level 10 magnification. For contrast, pixels of the map plane are alternately shaded. FIG. 15A illustrates a case where the two planes 1425 and 1427 are parallel with each at a zero tilt angle. In this case a pixel 1541 of the viewing plane 1525 matches the size of a pixel 1542 of the map plane 1527. The pixels 1541 and 1542 both have the same depth or height 1543. FIGS. 15B-15D illustrate the same portion 1423 of FIG. 14 but at different increasing angles 1420 between the planes. The different angles of 1420 may be proportional to different tilt angles of the viewing plane 1425 with respect to a normal of the map plane 1427. FIG. 15B illustrates that at a tilt angle (angle of incidence) of 15 degrees from normal, the depth 1543 of map plane pixel 1542 is projected on to the viewing plane 1425 as smaller than the height 1544 of display plane pixel 1541, where the map plane pixel 1542 represents the same size area as viewing plane pixel 1541 when the viewing plane is at zero tilt (as illustrated in FIG. 15A). FIG. 15C illustrates that at a tilt angle of 40 degrees from normal, the depth 1543 of map plane pixel 1542 is projected as even smaller than that of FIG. 15B. FIG. 15D illustrates that at a tilt angle of 70 degrees, the depth 1543 of map plane pixel 1542 is smaller still than that of FIG. 15C. Where a pixel 1542 of the map plane 1427 is initially rendered as the same size pixel 1541 of a viewing plane 1425 (FIG. 16A), up to three map plane pixels 1542 may fit within a single pixel 1541 of the viewing plane at a larger tilt angle (FIG. 15D). Importantly, the further out a map plane pixel is with respect to a viewing window position, the smaller its projection on a portion of the viewing plane. For example, the projected depth 1546 of a distal map plane pixel is smaller than the projected depth 1547 of proximal map plane pixel.

FIG. 15A illustrates that a zoom level 10 map data tile having a length of 2 pixels on the map plane 1427 would be rendered with a height of 2 pixels on the viewing plane 1425 when the angle of incidence is zero and a magnification of the view corresponds to zoom level 10. (Two pixels is the length of a zoom level 10 map data tile rendered at zoom level 10 magnification). As the angle of incidence of the viewing window or viewing plane is increased, the projection of the same 2 pixel vertical length (referred to as "depth" at a non-zero tilt) becomes less than two pixels in height on the viewing plane. FIGS. 15C and 15D illustrate that at a certain tilt angle range, the two pixel depth of the map data tile of the map plane may be only about one pixel on the viewing plane.

Figure 15E:
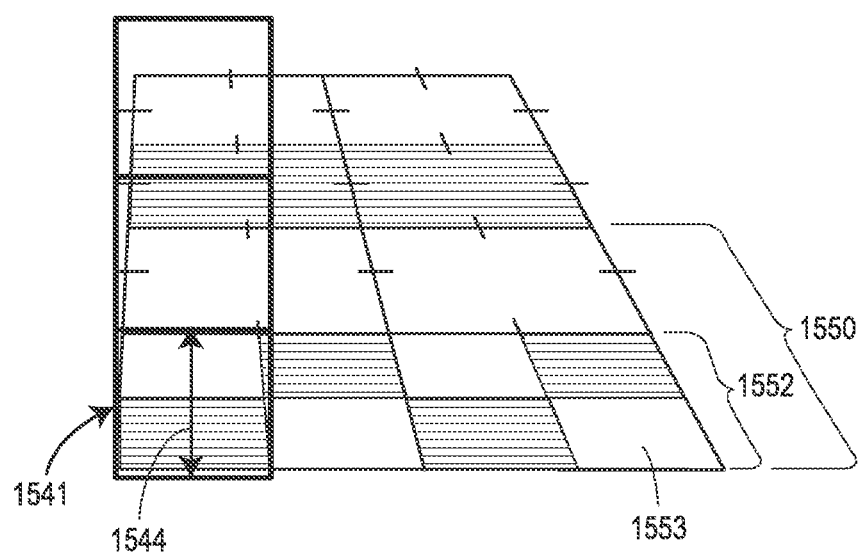

FIG. 15E illustrates an example view of a zoom level 9 map data tile 1550 rendered at zoom level 10 magnification where a portion of the map data tile is projected on to a display screen pixel 1541. As discussed above, the dimensions of the zoom level 9 map data tile 1550 rendered at zoom level 10 magnification may be larger than a zoom level 10 map data tile 1552 rendered at zoom level 10 magnification. FIG. 12 may be used to explain pixel relationships between zoom levels. As discussed, the zoom level 10 map data tile 1201 of FIG. 12 is rendered as 2×2 display screen pixels at zoom level 10 magnification and zoom level 9 map data tile 1202 is 4×4 display screen pixels of zoom level 10 magnification. Relating the size of screen pixels from different zoom level magnifications results in a ratio where 1 display screen pixel of zoom level 9 magnification subsumes 2×2 screen pixels at zoom level 10 magnification. Thus, zoom level 9 map data tiles may be 2×2 display screen pixels at zoom level 9 magnification but subsume four 2×2 display screen pixels when rendered at zoom level 10 magnification.

Returning to FIG. 15E, zoom level 9 map data tile 1550 is illustrated as four zoom level 9 pixels (i.e., pixels at zoom level 9 magnification) 1552, where each zoom level 9 pixel 1552 is 2×2 pixels 1553 at zoom level 10 magnification. FIG. 15E illustrates that where the tilt angle of the viewing plane is great enough and/or a depth position of the map data tile is far enough from the viewing plane, a map plane pixel 1552 of a lower zoom level magnification (representing a larger map plane area than a pixel of a higher zoom level magnification) may be projected to be approximate a display screen pixel 1541.

To summarize, a depth increment (d) along the map plane may be projected as a height increment (y) on a viewing window of the viewing plane (also referred to as a display screen). Generally, the further away the depth increment (d) is from the viewing window position, the smaller the projected height (y) is on the viewing window. Also, the greater the tilt angle, the smaller the height projection (y) is for the same depth increment (d). The depth increment may be a depth of a unit of area of a map surface corresponding to map data of a zoom level at a magnification of that zoom level. The unit of map surface area may be designated as the area represented by a display screen pixel of a map data tile rendered at its corresponding zoom level magnification at zero tilt. The area represented by the pixel of the map data tile may be fixed no matter the distortions that may arise from tilting a viewing plane or changing a zoom level. For example, in FIG. 12, the unit of map area represented by pixel 1200 on the map surface remains constant no matter what tilt angle and what zoom level magnification. If the magnification is increased (higher zoom level), the pixel may be enlarged but still represents the same map surface area. FIG. 12 also shows that a lower zoom level map data tile 1202 comprises four units of map area that correspond to four display screen pixels when the map area is rendered at a magnification of the lower zoom level. The four units of map area may be enlarged because they are magnified to a current higher zoom level of the display. In embodiments to be described below, calculations may be made to determine a projection of a unit of map area that corresponds to a pixel of map data when the map data is rendered at a magnification of a zoom level of the map data. The unit of map area may be referred to as a pixel of the map surface or map plane or map plane pixel.

In one embodiment, the transition or boundary between a first viewing band at a first depth range and second viewing band at a second depth range may be determined by approximating a depth at which the projection of a map plane pixel from one zoom level is within a threshold height with respect to a display screen pixel. Starting at this boundary and proceeding further in depth along the map surface, map data tiles from a lower zoom level may be used, where these map data tiles subsume larger areas of the map surface or map plane at a current zoom level of the view and are projected as larger heights (with respect to preceding lower depth areas) on the viewing plane. In one embodiment, the bands may be determined such that the projected map plane pixels approximate a display screen pixel.

Figure 16:
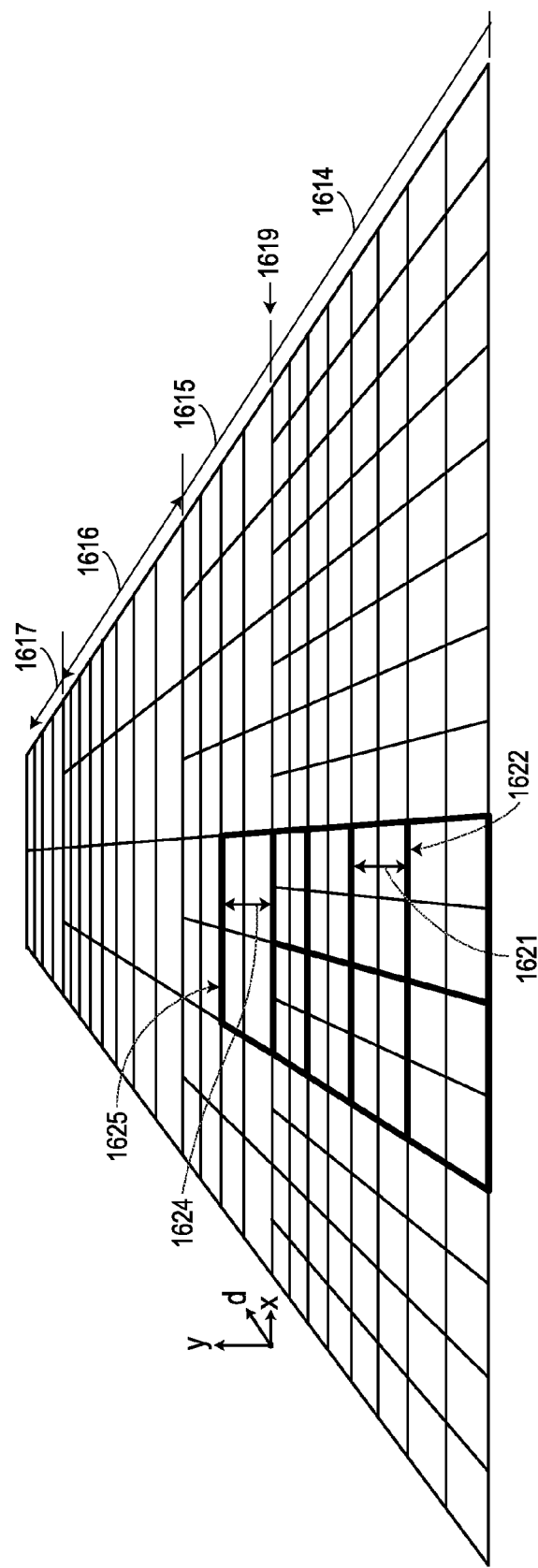
FIG. 16 illustrates a tilt view of a map surface using map data tiles from different zoom levels.

FIG. 16 illustrates an embodiment of the banding techniques described herein where map data tiles of zoom levels lower than a current zoom level of the viewing window is displayed at different depth ranges. FIG. 16 illustrates the same map plane or surface 1208 of FIG. 12 at a non-zero tilt angle and at a magnification corresponding to zoom level 10 (same as for FIG. 13). Areas 1614, 1615, and 1616 of FIG. 16 may correspond to areas 1210, 1220, and 1230 of FIG. 12, respectively. FIG. 16 illustrates that when the projection of a depth (d) of the map plane on to the height (y) of the viewing plane is smaller (in height) than a threshold, map data tiles from a lower zoom level may be used to render the map surface at that depth range. In particular, FIG. 16 illustrates setting a boundary 1619 between areas 1614 and 1615 where a projected viewing plane height 1621 of a zoom level 10 map data tile 1622 is approximate a projected viewing plane height 1624 of a zoom level 9 map data tile 1625. Determining which height of which map data tile of region 1614 to use as a baseline height may depend on a variety of factors. In the embodiment of FIG. 14 the height of a center map data tile is selected as a baseline.

In one embodiment, an algorithm may be used to set viewing bands based on a vertical position on a display screen. The algorithm may use a function that outputs a ratio of map plane pixel depth to display screen (viewing plane) pixel height based on a depth dimension of the map plane. A map pixel as used herein may refer to a unit of area of the map plane (e.g., map plane 1427 of FIG. 14) or map surface that corresponds to a display screen (e.g., of a viewing plane 1425 of FIG. 14) pixel when the viewing window (e.g., a portion of the viewing plane 1425) is at a zero angle of incidence with the map surface at a particular magnification (see FIG. 15A). A map pixel depth may refer to a distance dimension 1543 of the unit of area of the map plane (see FIG. 15C). A display screen pixel height may refer to the height of a display screen pixel which may be represented by length 1544 (see FIG. 15C).

A depth of a map surface pixel may be denoted as Ym, while the height of a display screen pixel may be denoted Ys. A change in depth position on the map (Ym) for a given change in height on the display screen (Ys) may be represented by the derivative dYm/dYs. An equation may relate the derivative dYm/dYs to a function F of a zoom level and a vertical coordinate on the screen:

$$dYm/dYs = F(Z, Ys, T)$$

where Z represents a zoom level, Ys is the height position on the screen, and T is an angle of incidence or tilt angle between the viewing window plane and the map plane. Solving the equation for Ys results in a function G that relates the vertical position on the screen at a particular zoom level and tilt angle to a particular ratio of map pixel depth to screen pixel height:

$$Ys = G(Z, dYm/dYs, T)$$

Using this function, the desired boundaries of a viewing band may be calculated base on a selected pixel height ratio. The pixel height ratio may be selected based on a number of factors. In one embodiment, the pixel height ratio may be based on empirical tests to determine pixel height ratios for the viewing bands so that the visual transition between bands is smooth and not abrupt. In some embodiments, the pixel height ratio may be adjustable. In one embodiment, viewing bands may be determined where the depth of a map pixel is never less than one screen pixel. In other words, a viewing band having map data of zoom level Z may be defined at vertical regions between G(Z, 1) to G(Z, 2). This may allow a map pixel to be up to twice its natural size before a next zoom level of map data is rendered (the map data tile or unit of map data at the viewing band boundary being projected at a size corresponding to a zoom level of the map data tile).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for rendering a three-dimensional map on a display device comprising:
    determining, using a computer device, a map surface plane and a viewing plane, wherein the viewing plane is at a non-zero angle of incidence with respect to the map surface plane;
    determining, using the computer device, a first unit of area on the map surface plane, the first unit of area representing a map area viewed at a first zoom level through the viewing plane when the viewing plane is at a zero angle of incidence with respect to the map surface plane, wherein the first unit of area has two dimensions along the map surface plane;
    calculating, using the computer device, a projection of a first dimension along the map surface plane of the first unit of area onto a first dimension along the viewing plane at the non-zero angle of incidence with respect to the map surface plane;
    determining, using the computer device, if the projection is at a threshold of the viewing plane, wherein the threshold relates to a length on the viewing plane;
    determining, using the computer device, a boundary on the viewing plane when the projection is determined to be at the threshold such that the location of the boundary changes as a function of a change in the non-zero angle of incidence; and
    rendering on the viewing plane a projection of a first area of the map surface plane on one side of the boundary using a first density of map data and rendering a projection of a second area of the map surface plane on a second side of the boundary using a second density of map data lower than the first density of map data.

2. The computer-implemented method of claim 1, wherein the first unit of area on the map surface plane corresponds with a pixel of the viewing plane when the map surface plane is rendered at the first zoom level and the viewing plane is at a zero angle of incidence with respect to the map surface plane; and further including determining a second unit of area on the map surface plane that corresponds with a pixel of the viewing plane when the map surface plane is rendered at a second zoom level and the viewing plane is at a zero angle of incidence with respect to the map surface plane, and wherein the second unit of area represents a larger area of the map surface plane than the first unit of area.

3. The computer-implemented method of claim 2, wherein the threshold is a height of one pixel of the viewing plane.

4. The computer-implemented method of claim 1, wherein rendering the first area includes using map data of the first zoom level and rendering the second area includes using map data of a second zoom level, wherein the second zoom level is a lower zoom level having a lower corresponding magnification and a lower map density than the first zoom level.

5. The computer-implemented method of claim 1, further including determining a second unit of area on the map surface plane, wherein the threshold is where the projection of the first dimension of the first unit of area on the viewing plane matches a projection of a second dimension of the second unit of area on the viewing plane.

6. The computer-implemented method of claim 1, wherein determining the boundary is based on a ratio of the projection of the first dimension of the first unit of area on the viewing plane to a height of one pixel of the viewing plane.

7. The computer-implemented method of claim 1, further including requesting, using the computer device, map data for rendering the projection of the first unit of area and the projection of the second unit of area.

8. The computer-implemented method of claim 7, wherein requesting map data includes providing a resolution of the display device as part of the request.

9. The computer-implemented method of claim 7, wherein requesting map data includes requesting the map data from a database stored on a different computer device.

10. A computer device comprising:
    a communications network interface;
    one or more processors;
    one or more memories coupled to the one or more processors;
    a display device coupled to the one or more processors;
    wherein the one or more memories include computer executable instructions stored therein that, when executed by the one or more processors, cause the one or more processors to:
    determine a map surface plane and a viewing plane, wherein the viewing plane is at a non-zero angle of incidence with respect to the map surface plane;
    determine a first unit of area on the map surface plane, the first unit of area representing a map area viewed at a first zoom level through the viewing plane when the viewing plane is at a zero angle of incidence with respect to the map surface plane, wherein the first unit of area has two dimensions along the map surface plane;
    calculate a projection of a first dimension along the map surface plane of the first unit of area onto a first dimension along the viewing plane at the non-zero angle of incidence with respect to the map surface plane;
    determine if the projection is at a threshold of the viewing plane, wherein the threshold relates to a length on the viewing plane;

determine a boundary on the viewing plane when the projection is determined to be at the threshold such that the location of the boundary changes as a function of a change in the non-zero angle of incidence; and render on the viewing plane a projection of a first area of the map surface plane on one side of the boundary using a first density of map data and rendering a projection of a second area of the map surface plane on a second side of the boundary using a second density of map data lower than the first density of map data.

11. The computer device of claim 10, wherein the first unit of area on the map surface plane corresponds with a pixel of the viewing plane when the map surface plane is rendered at the first zoom level and the viewing plane is at a zero angle of incidence with respect to the map surface plane; and further including determining a second unit of area on the map surface plane that corresponds with a pixel of the viewing plane when the map surface plane is rendered at a second zoom level and the viewing plane is at a zero angle of incidence with respect to the map surface plane, and wherein the second unit of area represents a larger area of the map surface plane than the first unit of area.

12. The computer device of claim 11, wherein the threshold is a height of one pixel of the viewing plane.

13. The computer device of claim 10, wherein the threshold is where the projection of the first dimension of the first unit of area on the viewing plane matches a projection of a second dimension of the second unit of area on the viewing plane.

14. The computer device of claim 10, wherein the boundary is determined based on a ratio of the projection of the first dimension of the first unit of area on the viewing plane to a height of one pixel of the viewing plane.

15. The computer device of claim 10, wherein rendering the projection of the first area of the map surface plane is based on map data of the first zoom level and rendering the projection of the second area of the map surface plane is based on map data of a second zoom level, wherein the second zoom level is a lower zoom level having a lower corresponding magnification and lower map density than the first zoom level.

16. The computer device of claim 15, wherein the one or more memories include computer executable instructions stored therein that, when executed by the one or more processors, cause the one or more processors to request first zoom level map data for rendering the projection of the first area of map surface plane and second zoom level map data for rendering the projection of the second area of the map surface plane.

17. The computer device of claim 16, wherein the request includes information on a resolution of the display device as part of the request.

18. The computer device of claim 17, wherein requesting map data includes requesting the map data from a database stored on a different computer device.

19. A computer device comprising:
a communications network interface;
one or more processors;
one or more memories coupled to the one or more processors;
a display device coupled to the one or more processors;
wherein the one or more memories include computer executable instructions stored therein that, when executed by the one or more processors, cause the one or more processors to:
determine a map surface plane and a viewing plane, wherein the viewing plane is at a non-zero angle of incidence with respect to the map surface plane;
determine a first unit of area on the map surface plane, the first unit of area representing a map area viewed at a first zoom level through a pixel of the viewing plane when the viewing plane is at a zero angle of incidence with respect to the map surface plane, wherein the first unit of area has two dimensions along the map surface plane;
determine a second unit of area on the map surface plane, the second unit of area representing a map area viewed at a second zoom level through a pixel of the viewing plane when the viewing plane is at a zero angle of incidence with respect to the map surface plane, wherein the second unit of area has two dimensions along the map surface plane;
calculate a projection of a first dimension along the map surface plane of the first unit of area onto a first dimension along the viewing plane at the non-zero angle of incidence with respect to the map surface plane;
determine if the projection is at a threshold of the viewing plane, wherein the threshold relates to a length on the viewing plane;
determine a boundary on the viewing plane when the projection is determined to be at the threshold such that the location of the boundary changes as a function of a change in the non-zero angle of incidence;
create an image containing a projection of the first unit of area of the map surface plane on one side of the boundary using a first density of map data and a projection of the second unit of area of the map surface plane on a second side of the boundary using a second density of map data lower than the first density of map data; and
transmit the image of the projection of the map surface.

20. The computer device of claim 19, wherein the one or more memories include computer executable instructions stored therein that, when executed by the one or more processors, cause the one or more processors to receive information about a display resolution of a client computer device.

* * * * *